United States Patent
Matthews et al.

(10) Patent No.: US 12,304,564 B2
(45) Date of Patent: May 20, 2025

(54) BOLT-ON FRONT BOLSTER FOR INTERMODAL CHASSIS

(71) Applicant: IPA Patents, LLC, East Hampton, NY (US)

(72) Inventors: Brent W. Matthews, London (CA); John S. Taylor, Memphis, TN (US)

(73) Assignee: IPA PATENTS LLC, East Hampton, NY (US)

( * ) Notice: Subject to any disclaimer, the term of this patent is extended or adjusted under 35 U.S.C. 154(b) by 257 days.

(21) Appl. No.: 17/831,514

(22) Filed: Jun. 3, 2022

(65) Prior Publication Data
US 2022/0388575 A1   Dec. 8, 2022

Related U.S. Application Data

(60) Provisional application No. 63/196,296, filed on Jun. 3, 2021.

(51) Int. Cl.
*B62D 21/20* (2006.01)
*B62D 27/02* (2006.01)
*B62D 27/06* (2006.01)

(52) U.S. Cl.
CPC .............. *B62D 21/20* (2013.01); *B62D 27/02* (2013.01); *B62D 27/065* (2013.01)

(58) Field of Classification Search
USPC ...................................................... 296/184.1
See application file for complete search history.

(56) References Cited

U.S. PATENT DOCUMENTS 3,924,544 A * 12/1975 Grau ....................... B60P 7/132
  410/83
4,496,187 A *  1/1985 Pontecorvo ........... B60P 1/6481
  296/25

(Continued)

FOREIGN PATENT DOCUMENTS

BE         1015052 A6      9/2004
CN       201914322 U  *   8/2011
(Continued)

OTHER PUBLICATIONS

PCT Search Report and Written Opinion Dec. 2, 2022.

*Primary Examiner* — Amy R Weisberg
*Assistant Examiner* — Veronica M Shull
(74) *Attorney, Agent, or Firm* — Danielle C. Sullivan; Carter Ledyard & Milburn LLP

(57) ABSTRACT

A front bolster and frame connection system for an intermodal chassis including a front bolster, a front gooseneck frame extending from the intermodal chassis having beams, mounting tabs attached to the front bolster, mounting tabs attached to the front gooseneck frame, a front gooseneck frame mounting plate welded to the end of the front end of the front gooseneck frame, and angle braces attached to the mounting tabs. The angle braces connect the bolt on front bolster and the front gooseneck frame. A retrofit kit and an alternate embodiment are also provided. The bolt on front bolster design of the present invention requires minimal cutting or grinding to remove and minimal welding to replace. The bolt on front bolster adds considerable value to operators in the intermodal market by facilitating service and eliminating chronic issues.

20 Claims, 28 Drawing Sheets

(56) References Cited

U.S. PATENT DOCUMENTS

| | | | | |
|---|---|---|---|---|
| 4,561,671 | A * | 12/1985 | DeWitt | B60P 1/6481 |
| | | | | 280/142 |
| 4,969,659 | A * | 11/1990 | Ehrlich | B62D 53/067 |
| | | | | 280/407.1 |
| 5,322,314 | A * | 6/1994 | Blum | B62D 21/20 |
| | | | | 280/789 |
| 5,794,960 | A * | 8/1998 | Sill | B62D 53/061 |
| | | | | 280/425.2 |
| 5,924,829 | A * | 7/1999 | Hastings | B62D 53/061 |
| | | | | 410/82 |
| 6,210,088 | B1 * | 4/2001 | Crosby | B60P 7/132 |
| | | | | 410/82 |
| 6,390,742 | B1 * | 5/2002 | Breeden | B65D 90/0013 |
| | | | | 410/82 |
| 9,387,792 | B2 * | 7/2016 | Lanigan, Sr. | B60P 1/6481 |
| 9,908,453 | B2 * | 3/2018 | McKibben | B62D 53/061 |

FOREIGN PATENT DOCUMENTS

| | | | | |
|---|---|---|---|---|
| CN | 202827758 | U | * | 3/2013 |
| CN | 208278162 | U | * | 12/2018 |
| EP | 3141422 | A1 | * | 3/2017 ............ B60P 1/6481 |

* cited by examiner

BOLT-ON FRONT BOLSTER FOR INTERMODAL CHASSIS

This application claims priority to U.S. Provisional Patent Application No. 63/196,296 filed Jun. 3, 2021, entitled "BOLT-ON FRONT BOLSTER FOR INTERMODAL CHASSIS" and is hereby incorporated by reference herein.

The present invention provides an improvement to an intermodal chassis.

BACKGROUND

Intermodal chassis having a front bolster welded to the end of the front frame is currently the industry standard. In the intermodal industry, the front frame may also be referred to as the gooseneck frame. In some enhanced versions of an intermodal chassis, the gooseneck frame is bolted on to the main frame of the chassis. When a front bolster is damaged, it must be removed from the gooseneck frame and repaired or replaced. An existing, damaged front bolster is removed from the gooseneck frame by torch cutting and/or disc grinding to extricate it from the front frame assembly. This causes the remaining front frame and upper coupler components to be subjected to a second round of heating (from welding) which further degrades their mechanical properties. This is generally known as the "heat effected zone." A repaired or new front bolster is then welded onto the gooseneck frame. A considerable total length of weld bead is required to ensure that the chassis has been suitably repaired and is safe to return to intermodal service. However, welding in most intermodal repair facilities is rarely as consistent as it is during original chassis production in a production facility with established and controlled welding procedures.

The present invention improves the existing art, adding considerable value to operators in the intermodal market, by facilitating service and eliminating chronic issues.

SUMMARY OF THE INVENTION

The present invention provides a bolt on front bolster design that requires zero or substantially reduced cutting or grinding to remove the front bolster and zero or substantially reduced welding to replace it. The bolt on front bolster adds considerable value to operators in the intermodal market by facilitating service and eliminating chronic issues. The removal/replacement time is substantially reduced. The present invention also eliminates chronic weld failure and weld bead build-up that causes intermodal containers to hang-up on the front bolster, preventing front locking pin engagement rendering the chassis unserviceable. The weight increase of the present invention from the existing art is minor and will be acceptable to intermodal operators because of the increase in serviceability of an intermodal chassis equipped with this invention.

The present invention provides a front bolster and frame connection system for an intermodal chassis including a front bolster, a front gooseneck frame extending from the intermodal chassis having beams, mounting tabs attached to the front bolster, mounting tabs attached to the front gooseneck frame, a front gooseneck frame mounting plate welded to an end of the front end of the front gooseneck frame, and angle braces attached to the front bolster and gooseneck frame mounting tabs, wherein the angle braces connect the front bolster and the front gooseneck frame.

The present invention also provides a front bolster retrofit kit including a front bolster, mounting tabs, an adapter plate, and angle braces that attach to the mounting tabs, wherein the angle braces connect the front bolster and an existing front gooseneck frame of an intermodal chassis.

The present invention also provides an alternate embodiment of a bolster and frame connection system for an intermodal chassis including a front bolster, a front gooseneck frame having beams extending from the intermodal chassis, connecting arms, wherein the connecting arms slide in between the gooseneck frame beams, and integral spacer plates, wherein the integral spacer plates provide a space between the connecting arms and one or more welds on the gooseneck frame beams.

BRIEF DESCRIPTION OF THE DRAWINGS

Further objects, features and advantages of the invention will become apparent from the following detailed description taken in conjunction with the accompanying figures showing illustrative embodiments of the invention, in which.

DESCRIPTION OF THE INVENTION

Figure 1:
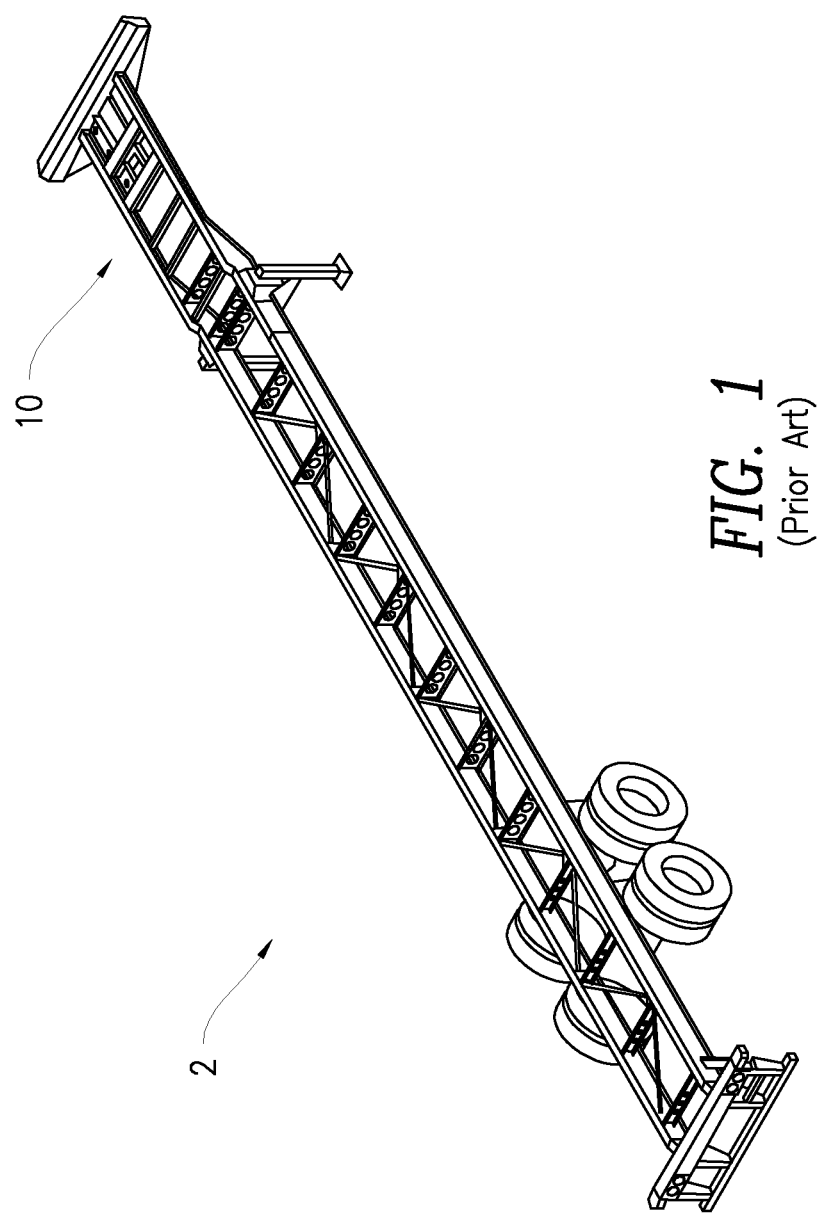
FIG. 1 shows an existing intermodal tandem axle chassis.
Figure 2:
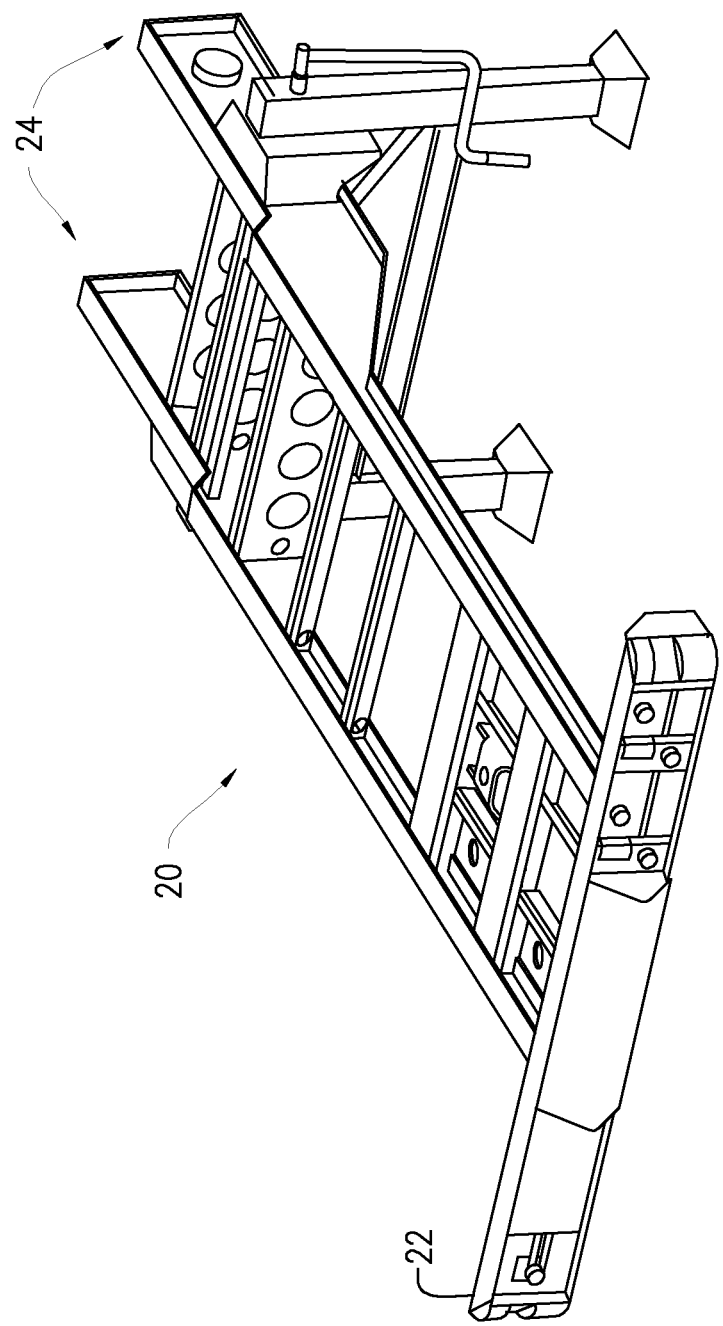
FIG. 2 shows an existing front frame, typical in the intermodal industry.
Figure 3A:
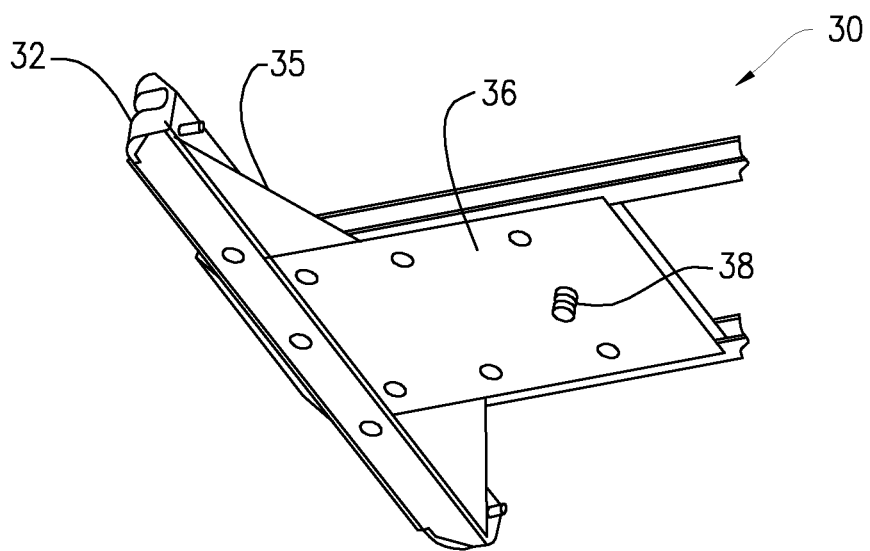
FIGS. 3a and 3b show a front bolster connection to a front frame in the prior art.
Figure 3B:
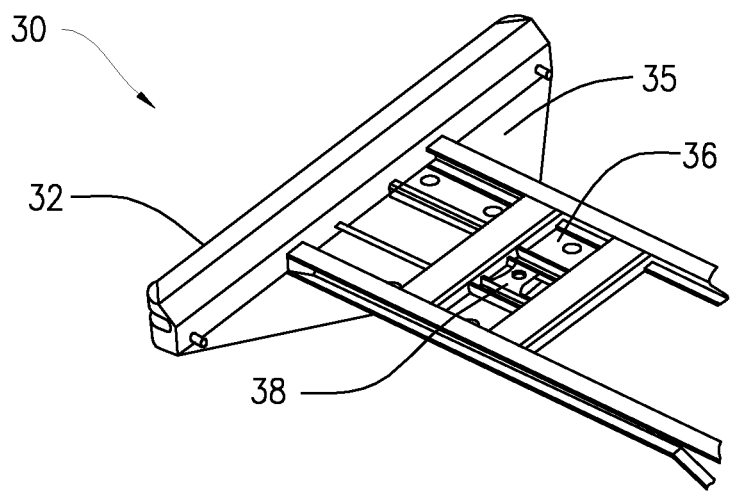

This invention provides a bolt on front bolster to address the deficiencies of existing front bolsters. FIG. 1 shows an existing intermodal chassis 2 used in the industry. The chassis includes a bolt on front gooseneck frame 10. FIG. 2 shows a front gooseneck frame 20. Front bolster 22 is welded to the end of front gooseneck frame 20. Frame 20 bolts onto the main frame of the chassis at the opposite end 24 of front bolster 22. FIGS. 3a and 3b show an existing front bolster design. Upper coupler 36 resides at the end of front frame 30 and houses kingpin 38. Wing style gussets 35 provide support to weld-on front bolster 32. Front bolster 32 is welded to the end of front frame 30 along each edge of each abutting component of front frame 30. Intermodal chassis also exist that are one piece. The bolt on front bolster of the present invention can also be applied to the "one piece" chassis frame design, as well as the rear bolster that is typically separable.

Figure 4A:
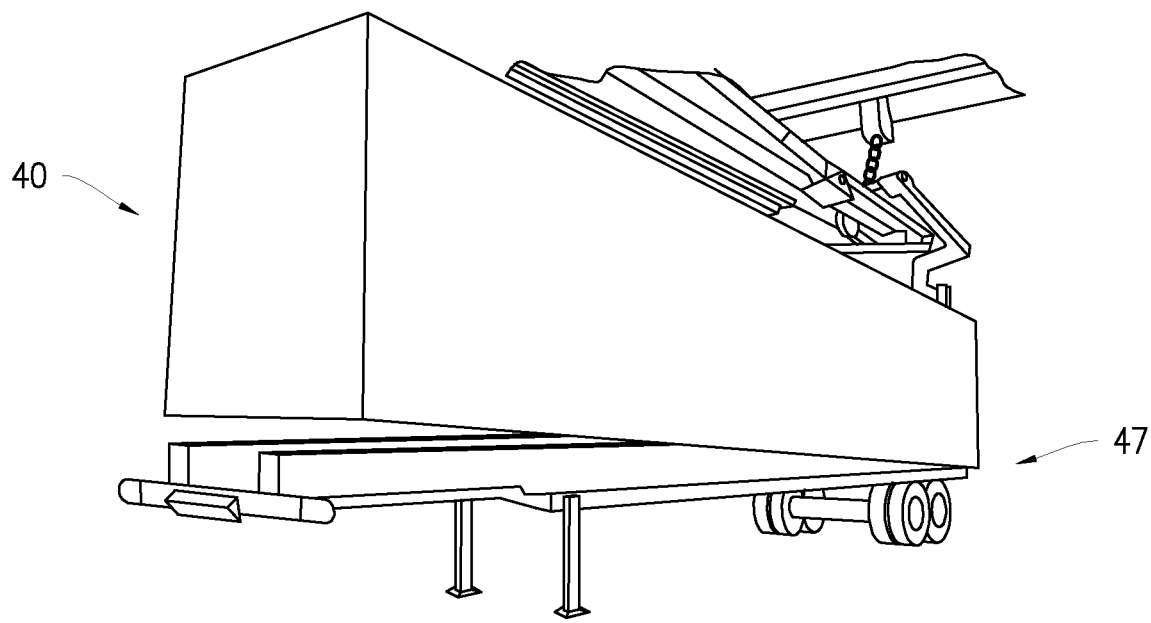
FIGS. 4a and 4b show the handling of a container onto the chassis.
Figure 4B:
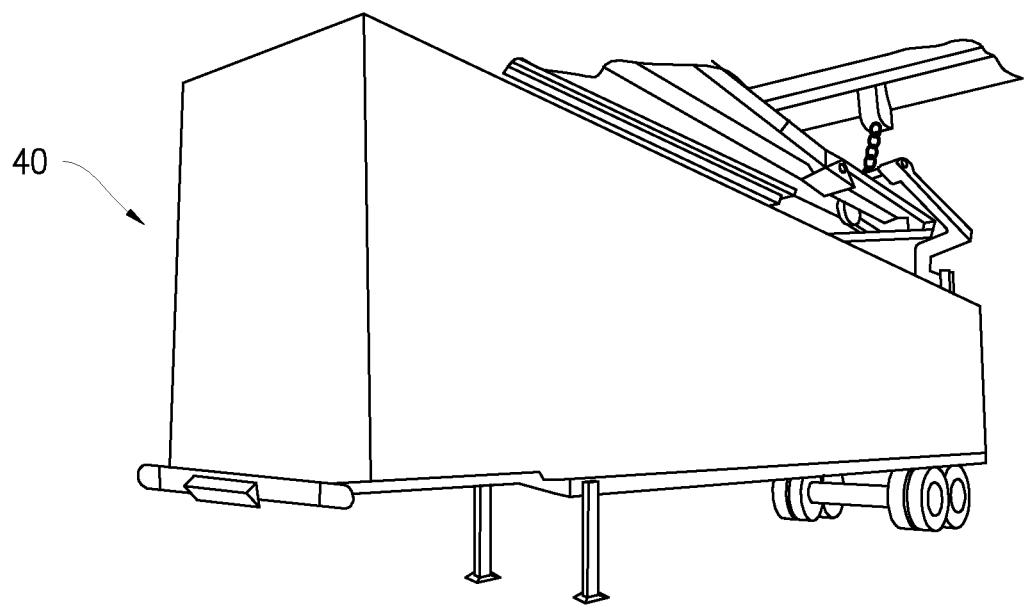
Figure 5A:
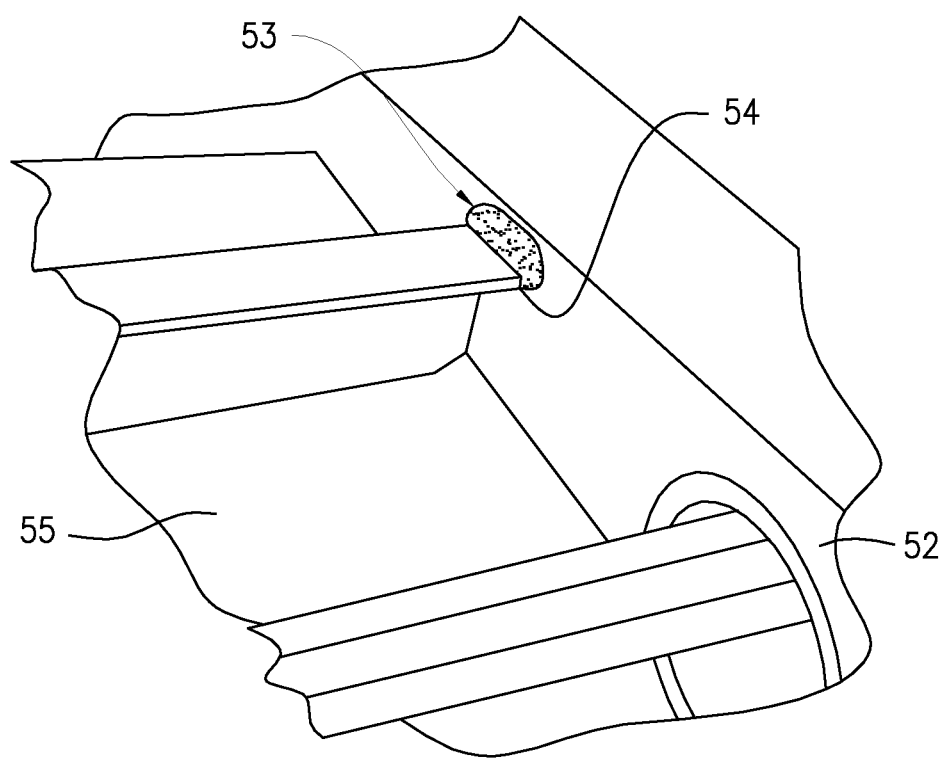
FIGS. 5a and 5b show chronic weld build up between a front bolster and front frame which occurs in the prior art.
Figure 5B:
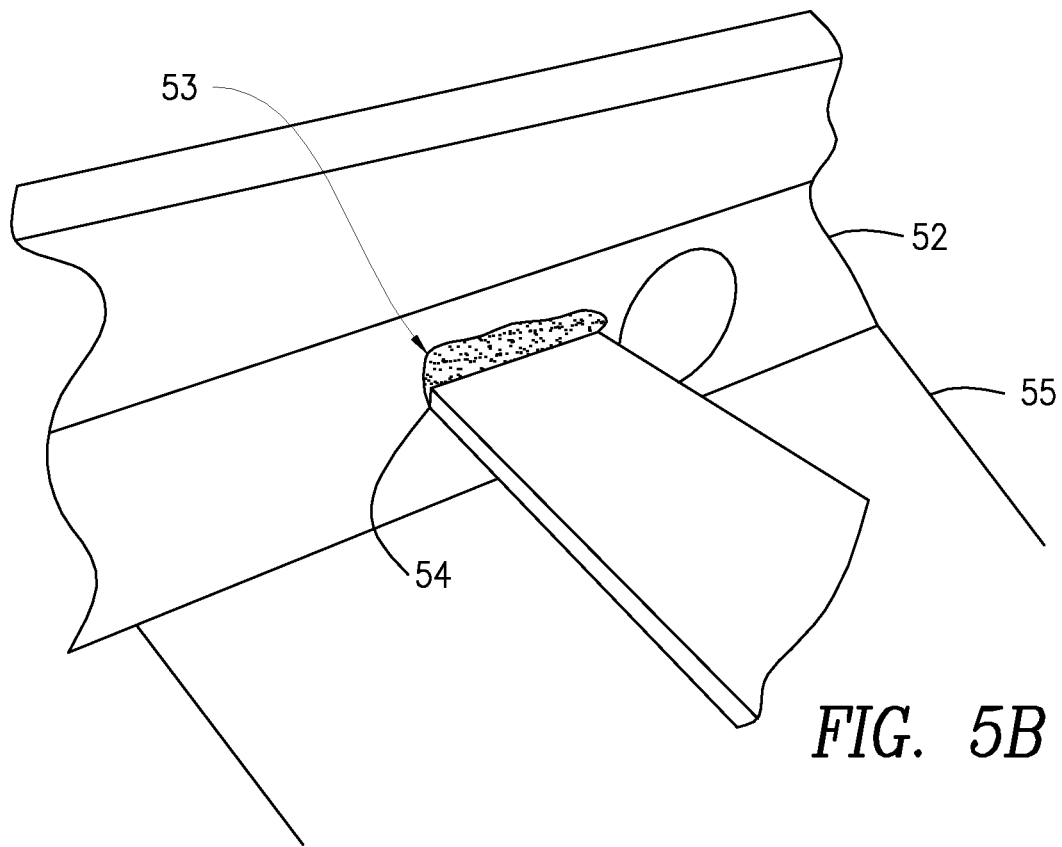

During use, the front bolster is subjected to considerable stresses caused by the loading and unloading of intermodal containers. When loaded onto a chassis using an overhead crane or other suitable handling equipment, container 40 is typically first lowered onto rear twist locks 47 (FIG. 4a) and then the container is fully lowered onto the chassis as seen in FIG. 4b. The front bolster is also subjected to cyclical stress which often results in fatigue failure of weld joints between the front bolster and the front frame. Welds that fail must be repaired to ensure safe operation of the chassis. This repair results in "build up" 53 at weld joints 54 between front bolster 52 and front frame 55, as seen in FIGS. 5a and 5b, that causes intermodal containers to hang up on these larger weld beads, preventing front bolster locking pin engagement. Front bolster locking pins (which can be seen as 77 in FIGS. 7 and 87 in FIG. 8) must be engaged for safe transportation of an intermodal container when loaded onto an intermodal chassis. When the front bolster locking pins cannot be engaged, the chassis is rendered unserviceable. This situation is unacceptable for intermodal operators.

Figure 6A:
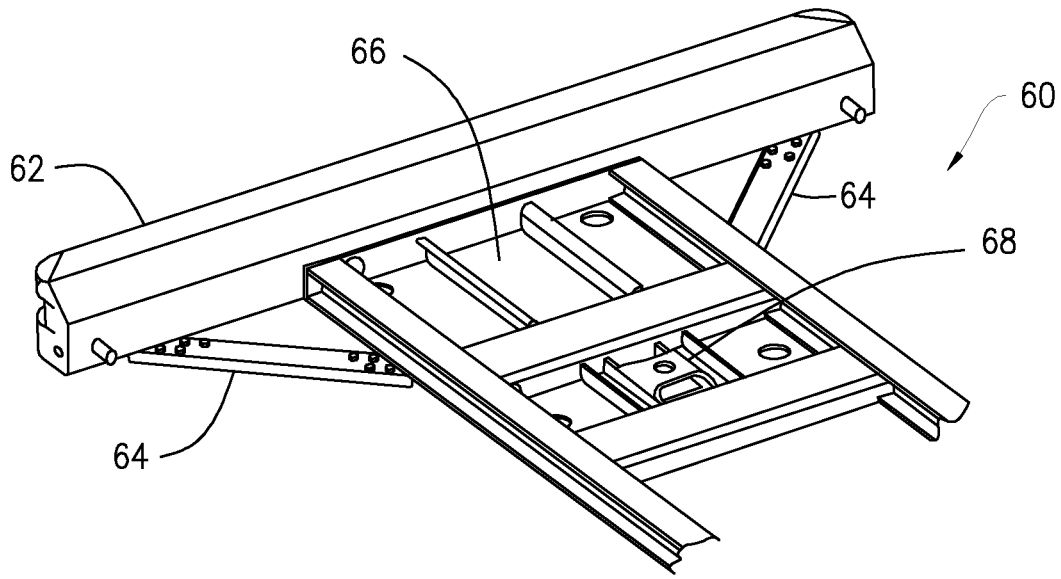
FIGS. 6a and 6b show an exemplary embodiment of the present invention bolt-on front bolster.
Figure 6B:
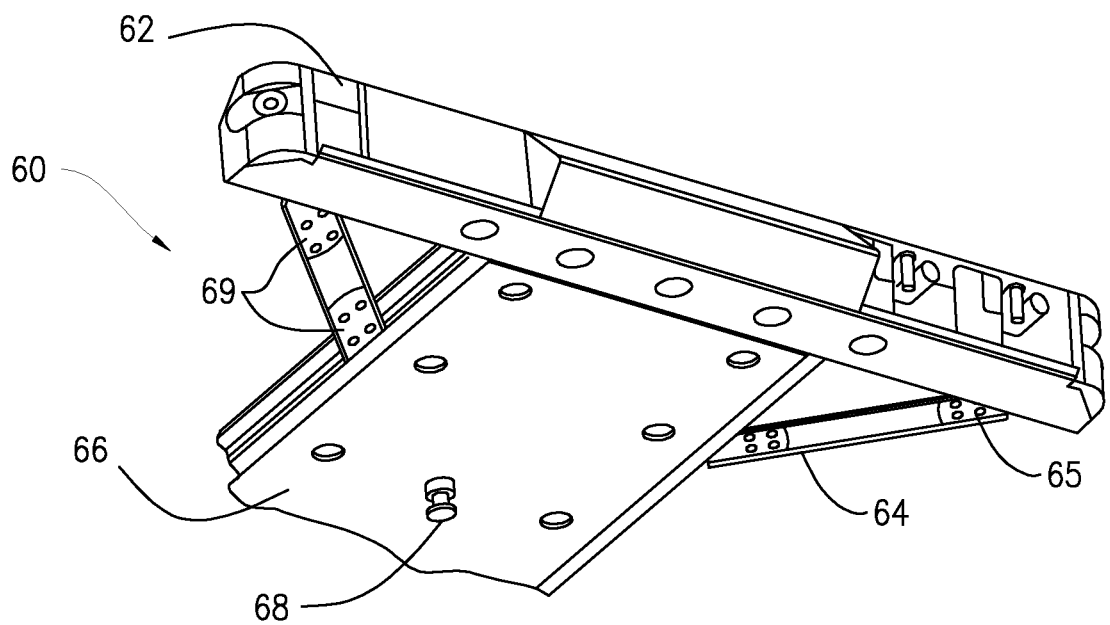
Figure 7:
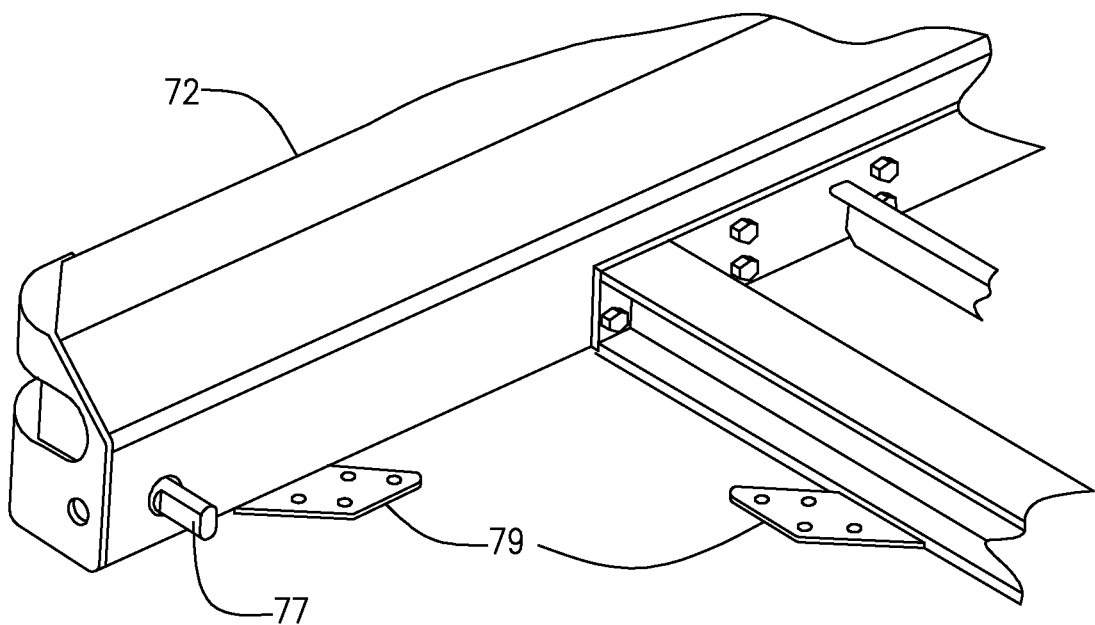
FIG. 7 shows the mounting tabs in an exemplary embodiment of the present invention.
Figure 8:
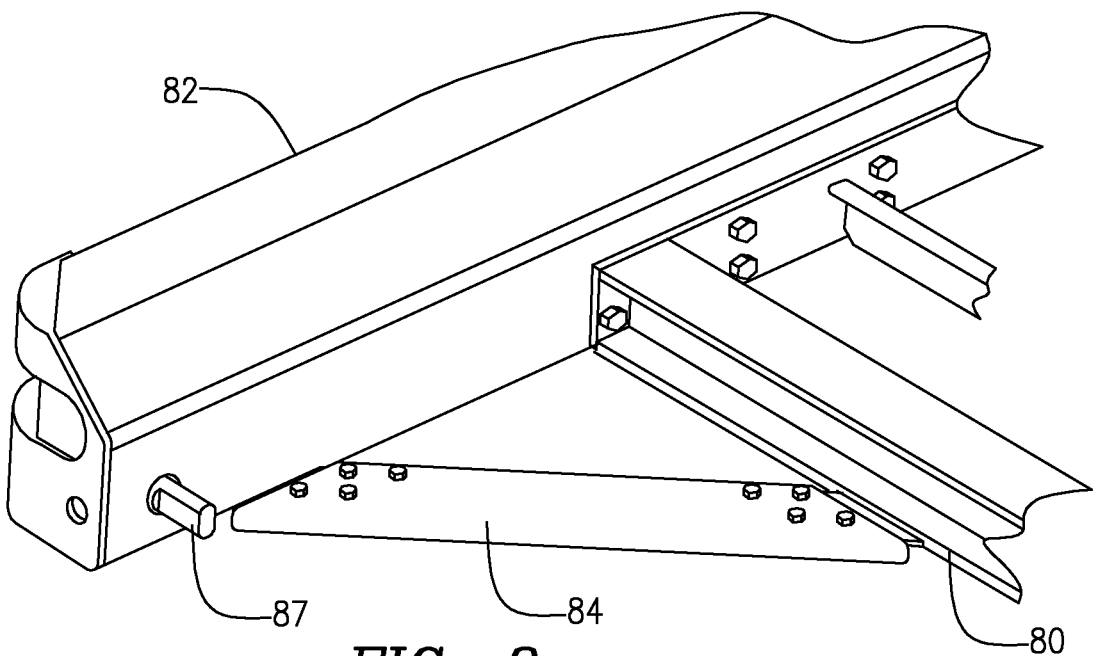
FIG. 8 shows an angle brace in an exemplary embodiment of the present invention.

FIGS. 6a and 6b show an exemplary embodiment of the present invention. Front bolster 62 is located at the end of front gooseneck frame 60, the same position as the existing art. Upper coupler 66 resides at the end of front frame 60 and houses kingpin 68. Angle braces 64 (formed channels are the preferred embodiment; however other suitable designs are possible) are bolted onto welded-on mounting tabs 69 using fasteners 65. This replaces the winged gussets typically used in prior art. Angle braces 64 and mounting tabs 69 may similar to those used on the rear bolster. Mounting tabs 79 are shown in FIG. 7. Mount tabs 79 are welded on front bolster 72. FIG. 8 shows a closer view of angle braces 84. Angle brace 84 connect front bolster 82 and front frame 80.

Figure 9A:
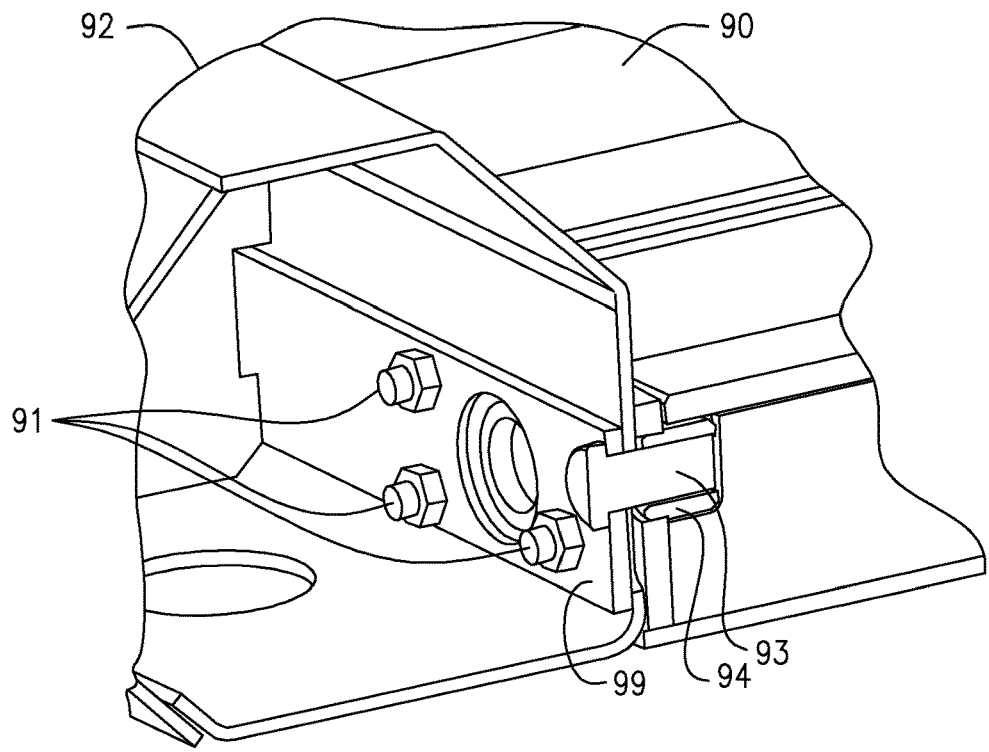
FIGS. 9a and 9b show locating pin/receivers in an exemplary embodiment of the present invention.
Figure 9B:
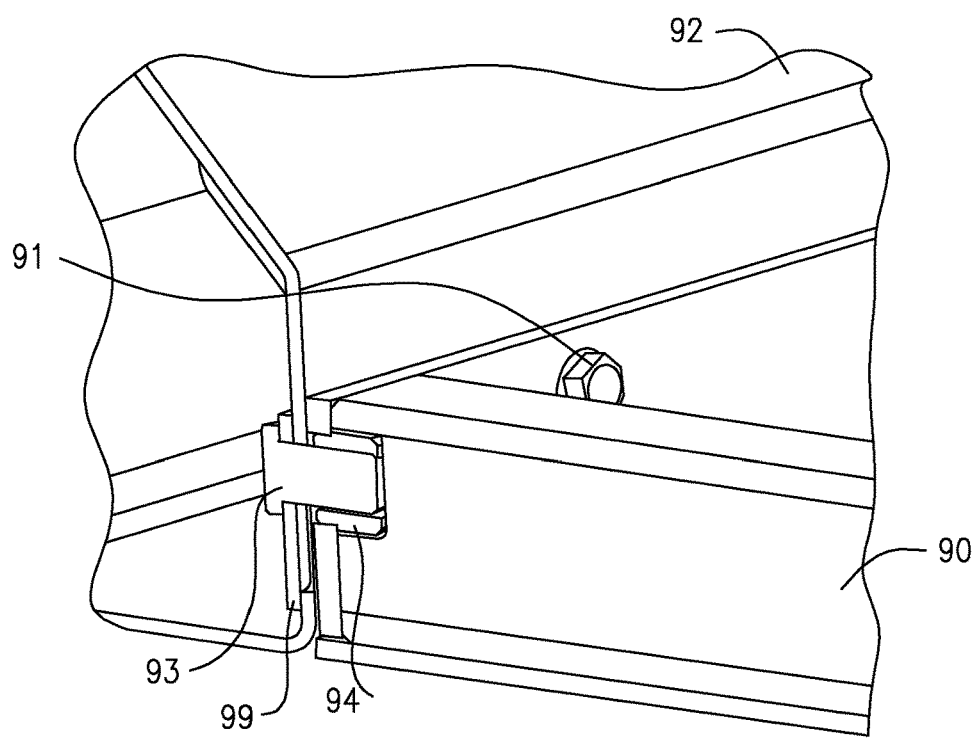

FIGS. 9a and 9b show locator pins/receivers 93, 94, respectively. Weld nuts with fasteners protrude through locator pins/receivers 93, 94. Locator pins/receivers 93, 94 provide a shear element that, when coupled with the clamping frictional forces created between mounting plates 99 welded into the front frame and backing plates that reside inside the front bolster, replaces the total effective length of the weld beads to connect the front bolster 92 to front frame 90 in conventional designs creating a similar strong, permanent connection. Mounting plate 99 and backing plates are connected with weld nut and fasteners 91 after locator pins/receivers 93, 94 provide alignment. Fasteners are ideally subjected to zero shear stress and are simply in tensile loading condition when torqued in place. Locator pins 93 ensure exact final front bolster 92 positioning. Locator pins/receivers 93, 94 are shown as the preferred embodiment, however, there exist other suitable locating and/or shear element designs that would serviceably achieve similar results and performance, such as blocks of steel "nestled" in between the top and bottom flanges of the gooseneck frame beam.

Figure 10:
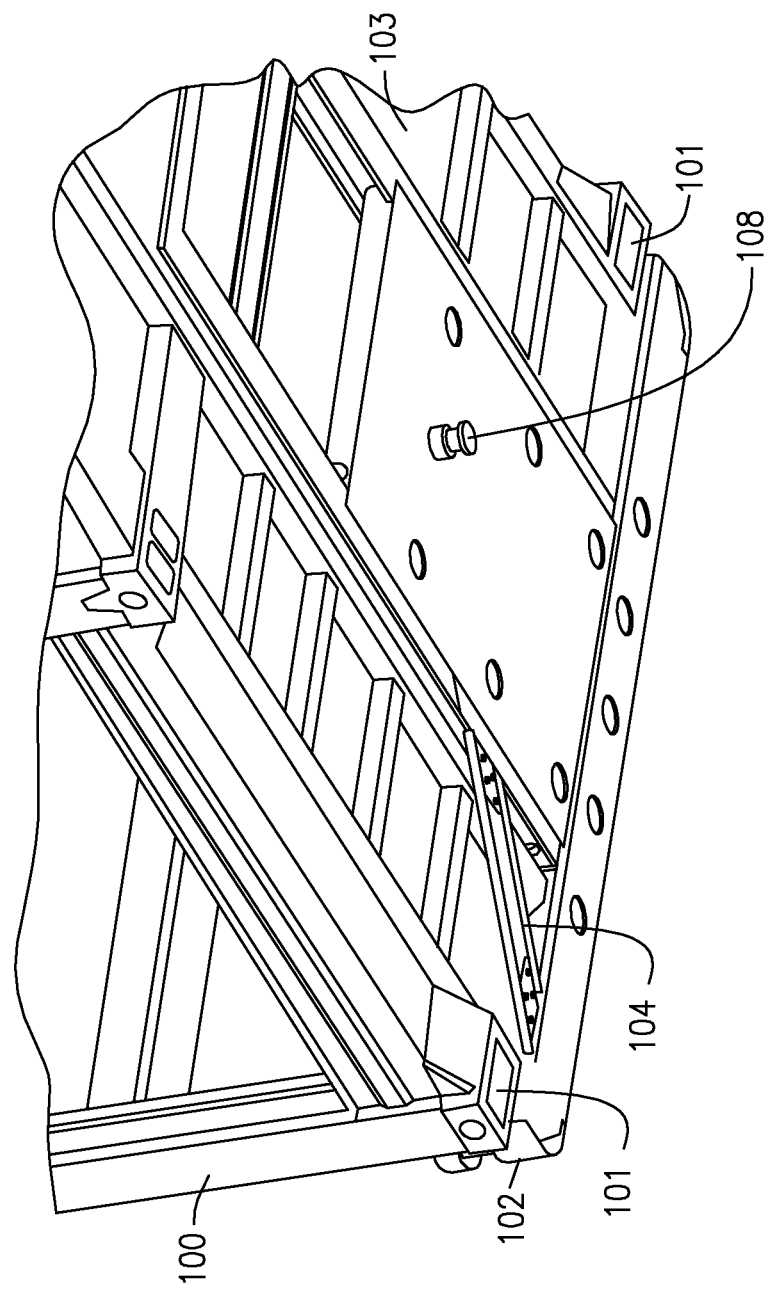
FIG. 10 shows the clearance with container mating points using the present invention.
Figure 11:
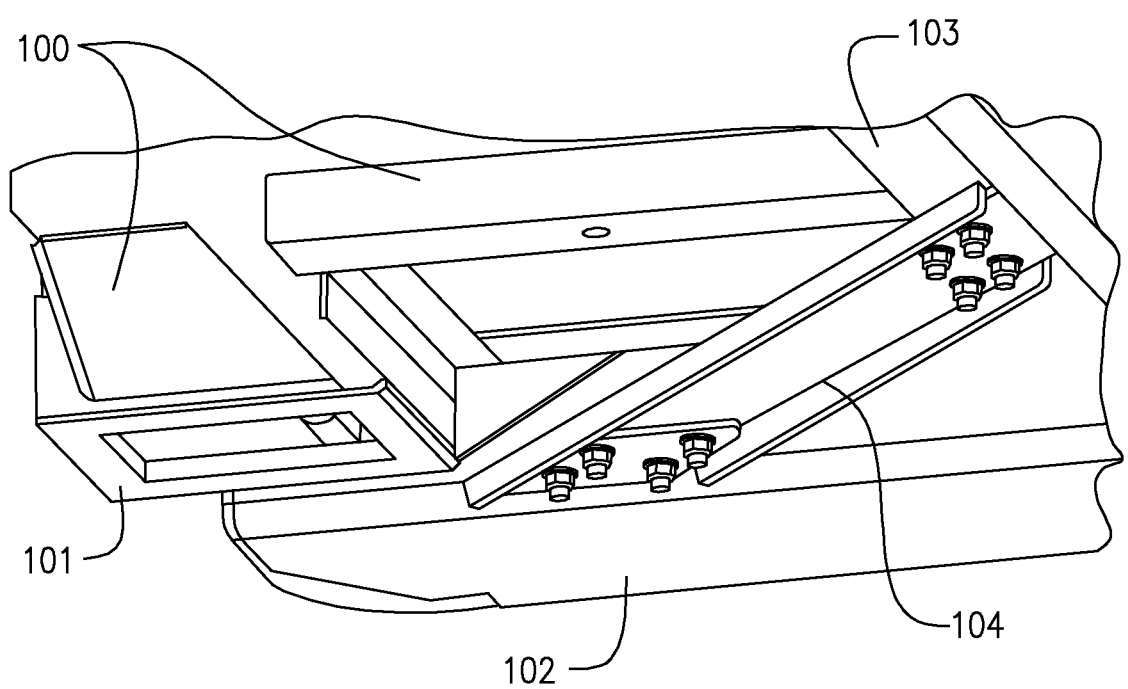
FIG. 11 shows another view of the clearance with container mating points using the present invention.
Figure 12:
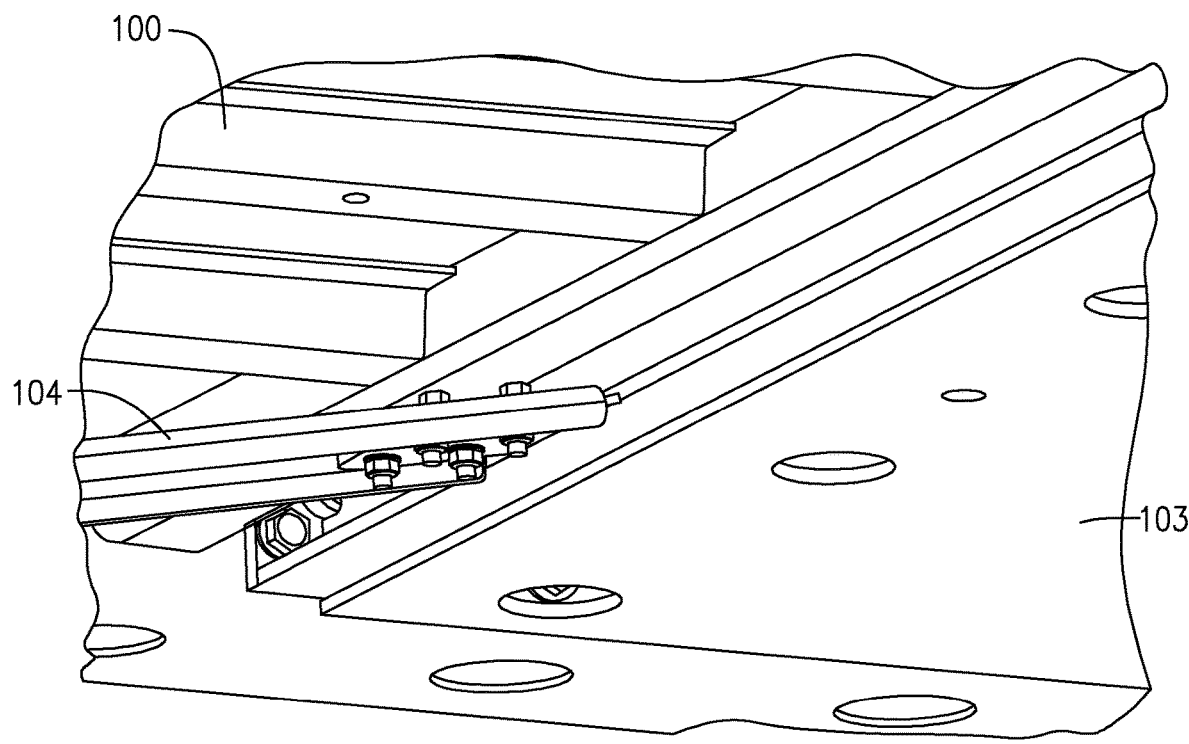
FIG. 12 shows another view of the clearance with container mating points using the present invention.

FIGS. 10, 11, and 12 show the mating interface with the present invention and container 100 when container 100 is loaded onto the chassis. There exists sufficient clearance with container 100 mating points including bolt on front bolster 102, front frame 103, angle brace 104 and kingpin 108. There is sufficient clearance with front castings 101 on the container whose dimensions and locations are dictated by AAR-M930 (FIG. 11). There is sufficient clearance with $5^{th}$ wheel (swing radius). (FIG. 12). The only identified point of potential interferences is the gooseneck tunnel of the container and the fastener heads on the angle brace. Some vintages of containers may have deeper tunnels. If that is the case, as a precaution, the fasteners may be replaced with weld studs, which have substantially lower profile heads, or other suitable fastening means may be employed.

Figure 13:
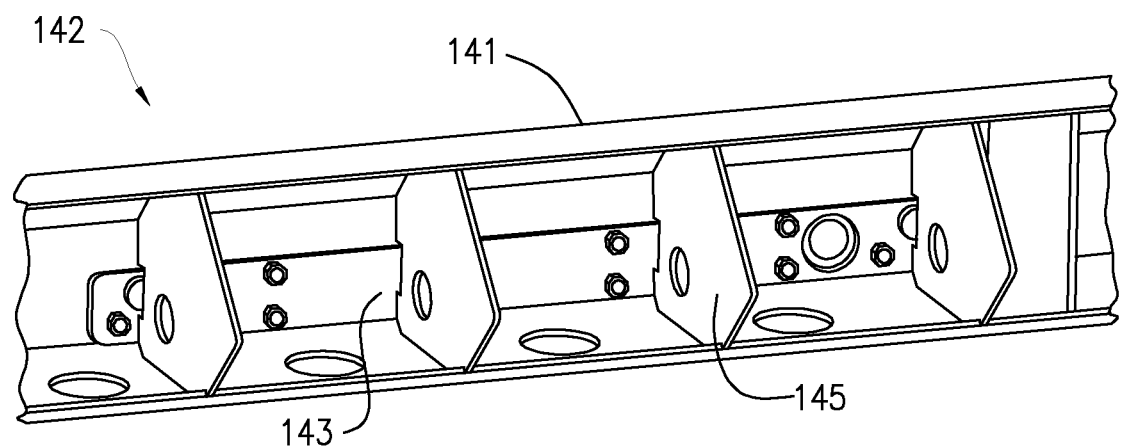
FIG. 13 shows an exemplary embodiment of the backing plate in the present invention.

FIG. 13 shows bolt on front bolster 142 with backing plate 143. Backing plate 143 has suitable thickness to achieve the required front bolster strength, for example, ⅜ inch thick. Backing plate 143 mirrors front bolster channel 141 in hole pattern dimensions to form a composite, sandwiched construction. Internal front bolster stiffeners 145 are notched to receive backing plate 143. Backing plate 143 is connected to front bolster channel 141 with a perimeter welds on the inside of front bolster 142

Figure 14A:
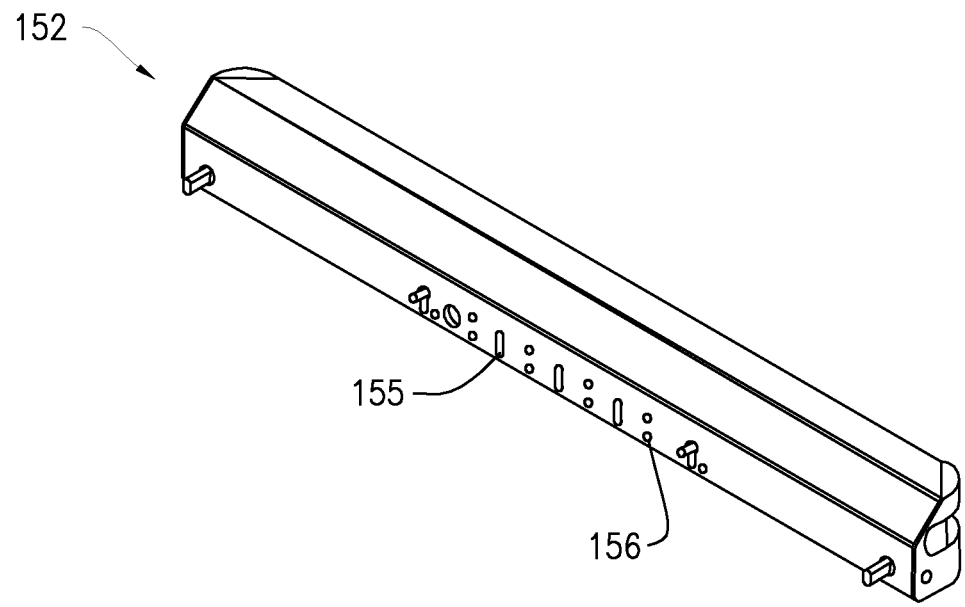
FIGS. 14a and 14b show an exemplary embodiment of plug welded slots on a bolt on front bolster.
Figure 14B:
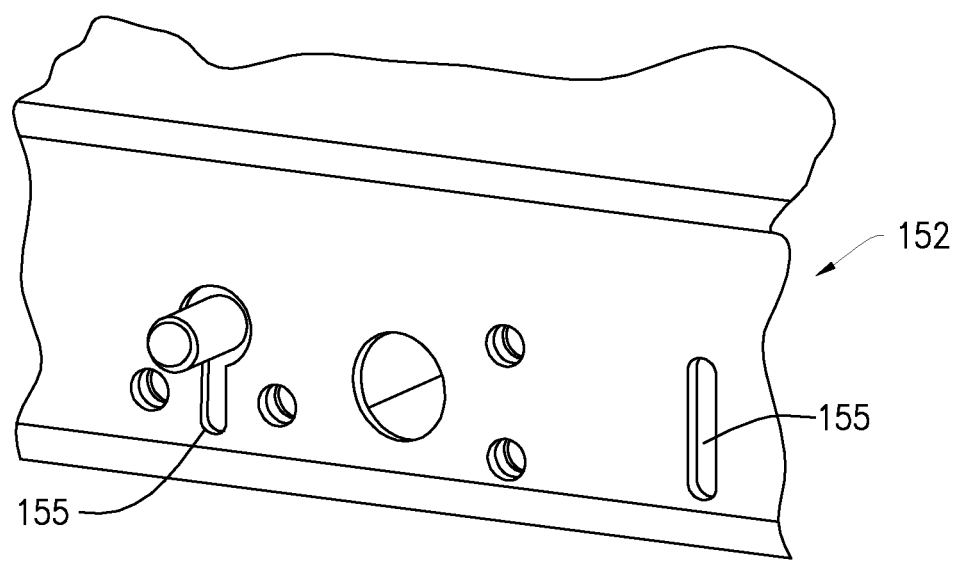

FIGS. 14a and 14b show an exemplary embodiment of a front bolster of the present invention. Front bolster 152 has plug welded slots 155 and bolt on front fasteners, such as weld nuts 156. Prior art does not use plug welding at all for a front bolster connection. Plug welds are used in the present invention to weld two plates together and then, after grinding, the weld joint can sometimes not be visible. The use of plug welds provides a strong weld connection without creating an increase in height that is otherwise created by a conventional fillet weld. Plug welded slots are ground flat to ensure zero interference with the leading edge of the container. However, internal welding of the backing plate to the front bolster channel may be sufficient, negating the need for these plug welds, further reducing time and cost to manufacture front bolster 152.

Figure 15:
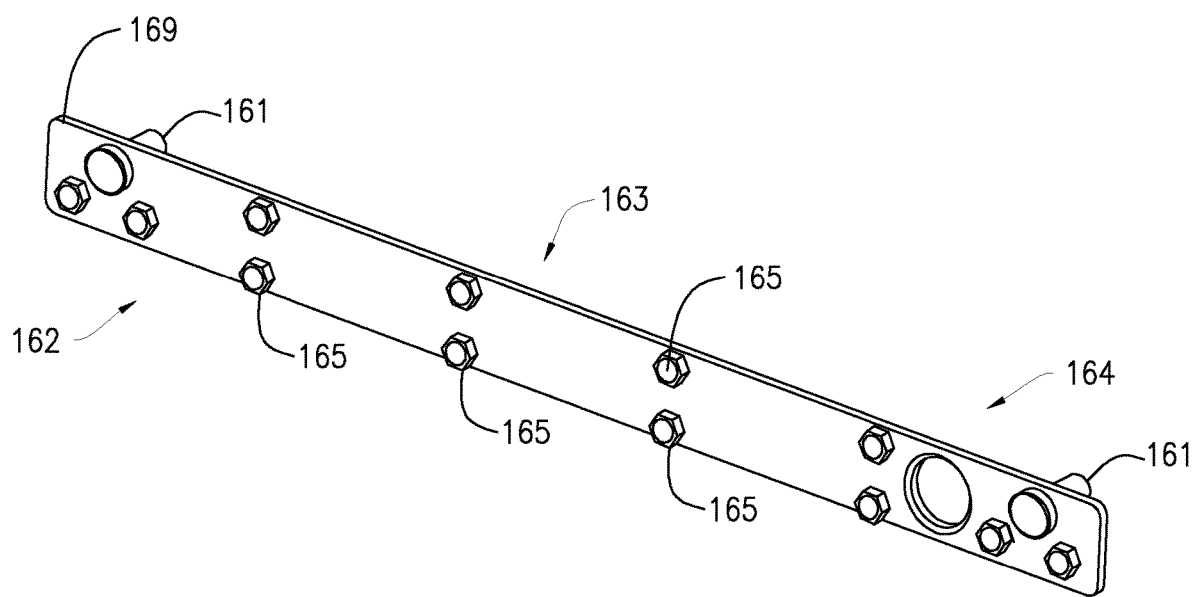
FIG. 15 shows an exemplary embodiment of a front bolster backing plate in the present invention.

FIG. 15 shows an exemplary embodiment of backing plate 163 of the present invention. Two locating pins 161 and weld nuts 165 are fillet welded all around to front face 162 of front bolster backing plate 163. There is no welding on rear face 164 of front bolster backing plate 163 to ensure zero interference when abutting against the inside face of the front bolster channel (as shown as front bolster channel 141 in FIG. 14).

Figure 16A:
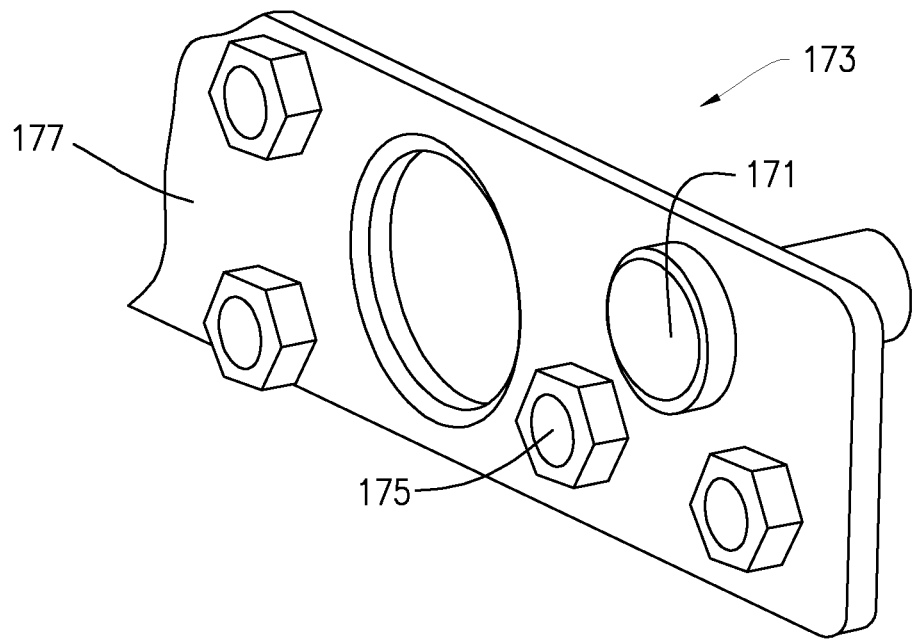
FIGS. 16a and 16b show an exemplary embodiment of a locating pin and weld nuts in the backing plate.
Figure 16B:
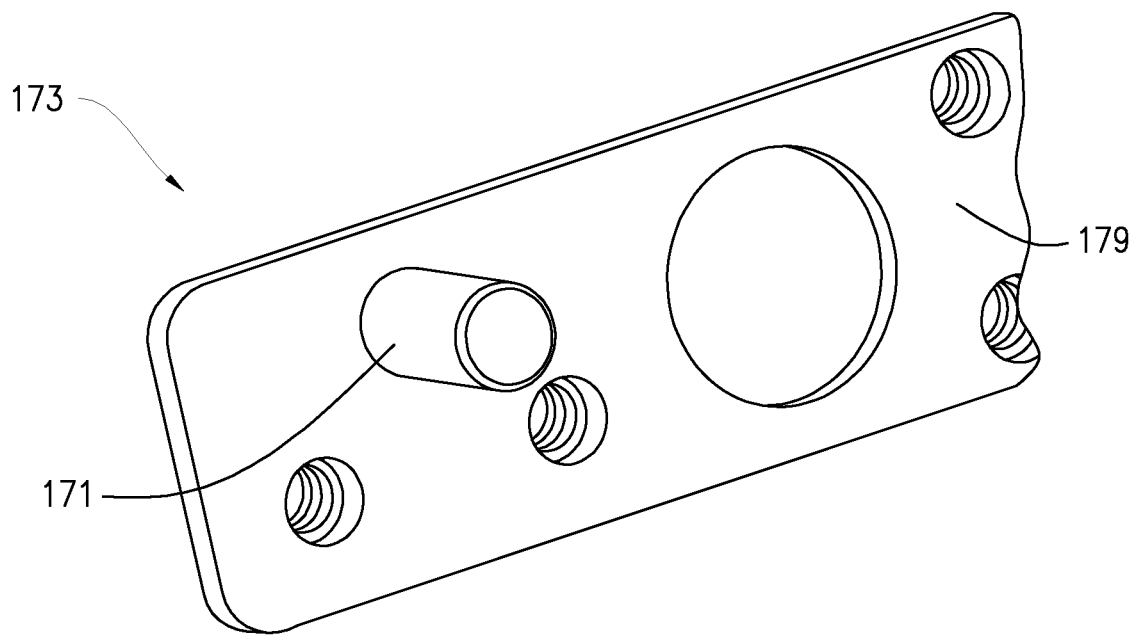

FIG. 16a shows front face 177 of backing plate 173 and FIG. 16b shows rear face 179 of backing plate 173. Locating pin 171 and weld nuts 175 center align thru holes in backing plate 173. Weld nuts 175 are piloted to facilitate concentric alignment. Non-piloted weld nuts may also be employed if suitable weld fixtures and/or procedures are used during production of this present invention.

Figure 17A:
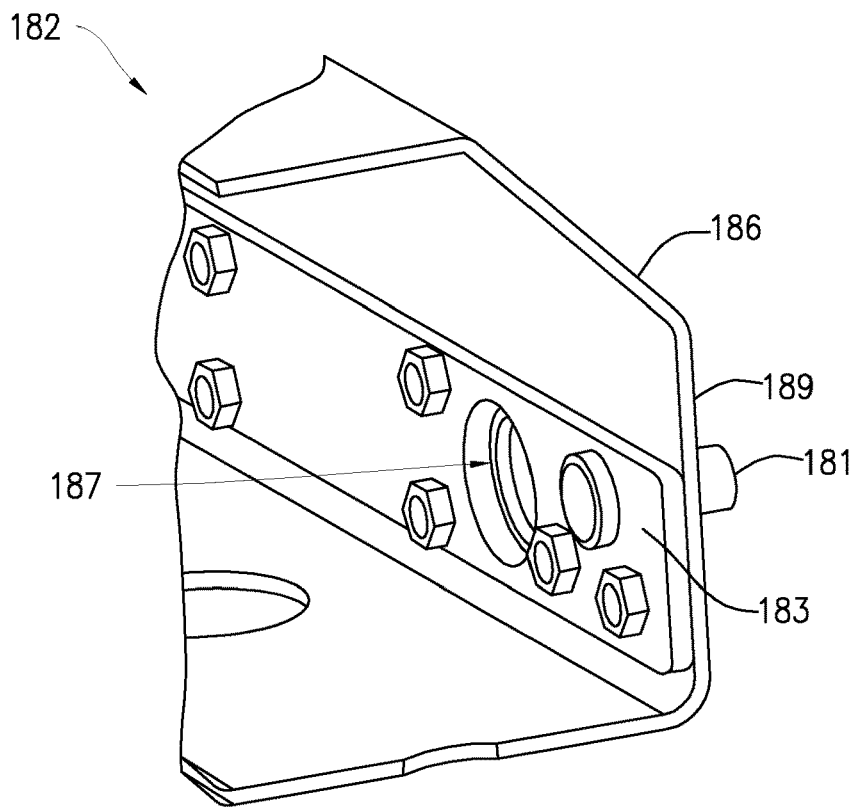
FIGS. 17a and 17b show an exemplary embodiment of a bolt-on front bolster.
Figure 17B:
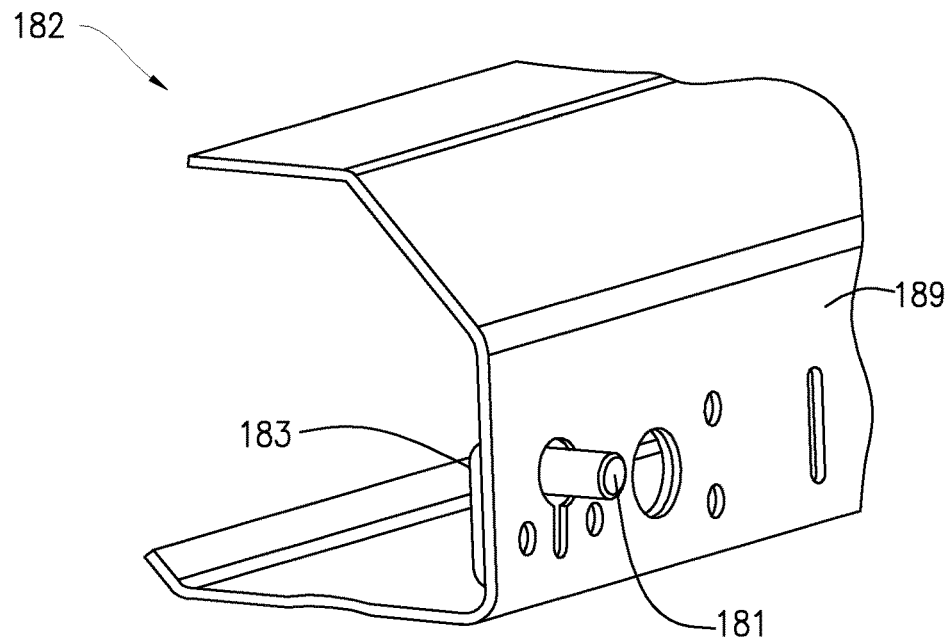

FIGS. 17a and 17b show an exemplary embodiment of bolt on front bolster 182. Backing plate 183 is fillet welded to inside of front bolster channel 186 and has a broken edge 187. Backing plate 183 and locating pin 181 body may also be plug welded on rear face 189 of front bolster channel 186 if additional strength of the connection between front bolster 182 and the gooseneck frame is required/desired. Welds on rear face 189 of front bolster 182 are ground flat to ensure proper fit-up of the container when it is loaded onto the chassis. A suitable rubber grommet may also be used instead.

Figure 18A:
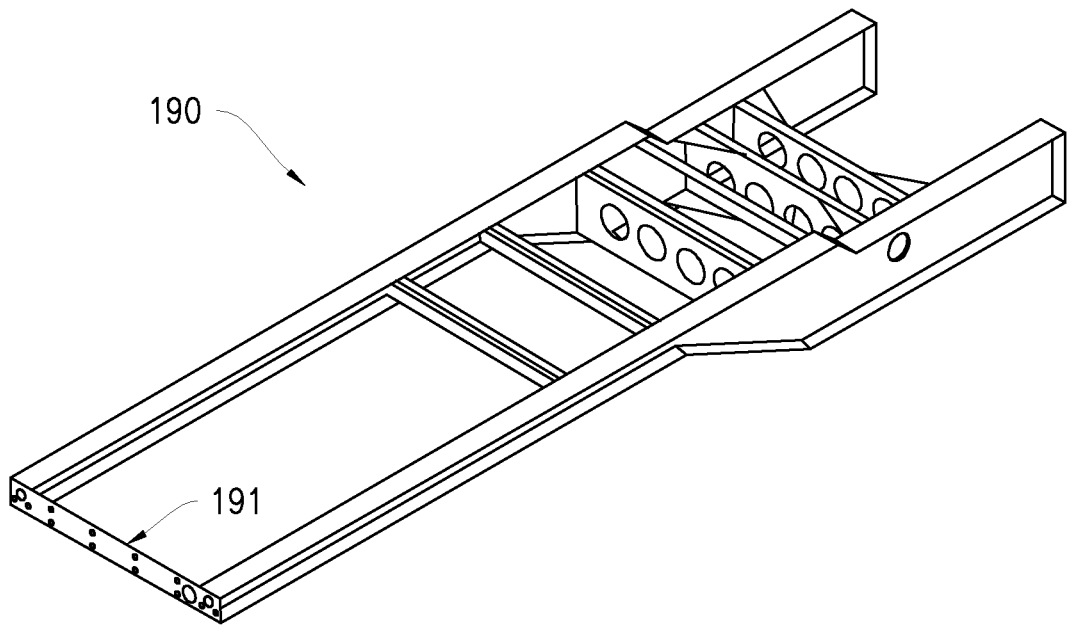
FIGS. 18a and 18b show a gooseneck frame and frame beams.
Figure 18B:
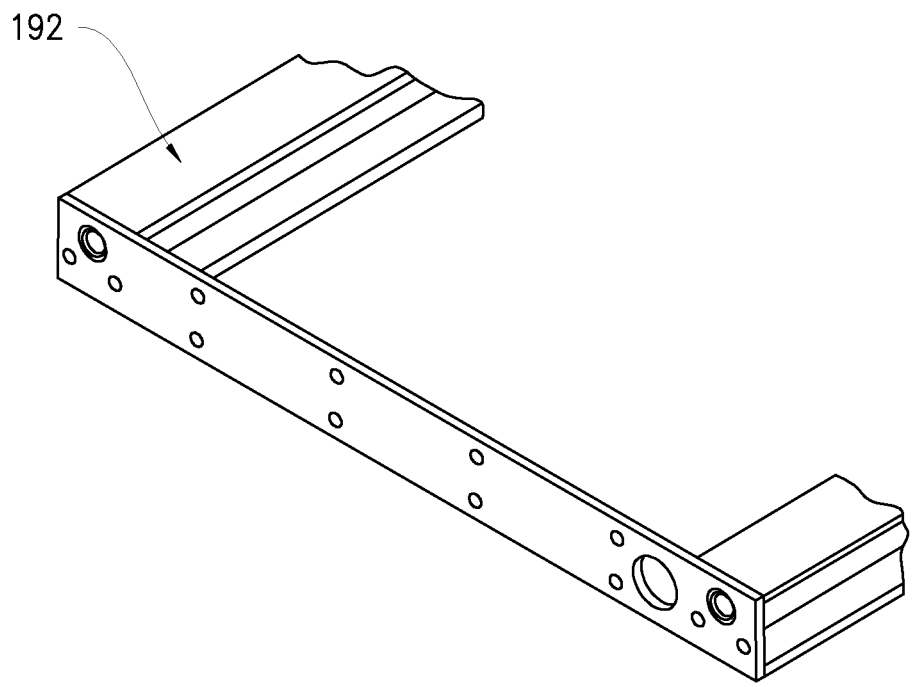

FIGS. 18a and 18b show gooseneck frame 190 (FIG. 18a) and ends of frame beams 192 (FIG. 18b). A gooseneck frame mounting plate 191 having suitable thickness to achieve the required front bolster strength, is welded to ends of gooseneck frame beams 192 in the same way the front bolster is welded to the gooseneck frame in the conventional art. All front frame elements are shorter (axially) by the distance equal to the thickness of the gooseneck frame mounting plate to ensure longitudinal positioning of the front bolster is maintained.

Figure 19:
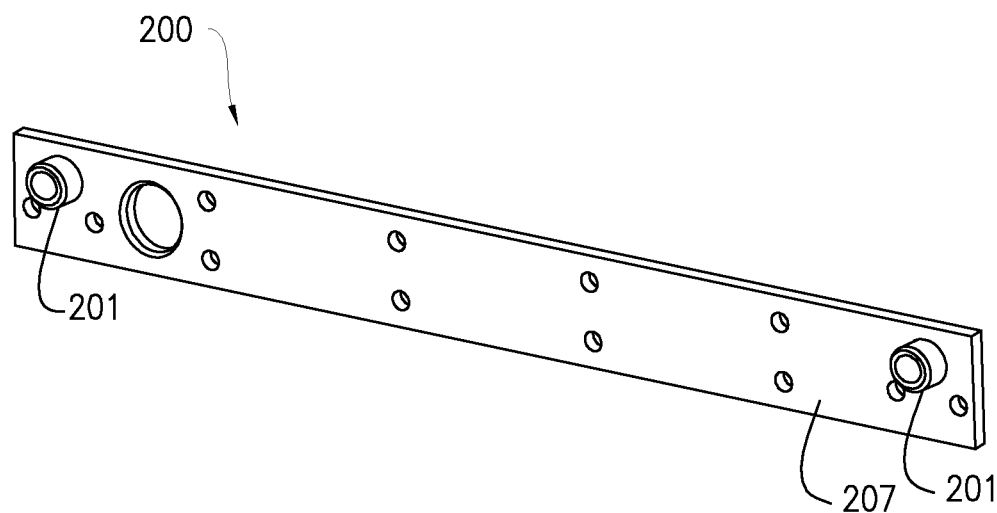
FIG. 19 shows an exemplary embodiment of a gooseneck frame mounting plate.

FIG. 19 shows an exemplary embodiment of a gooseneck frame mounting plate 200 of the present invention. Two locating pin receivers 201 are fillet welded all around to gooseneck frame mounting plate 200. There is no welding on front face 207 of the gooseneck frame mounting plate 200 to ensure zero interference when abutting against the inside face of the front bolster channel (as shown as front bolster channel 141 in FIG. 14).

Figure 20:
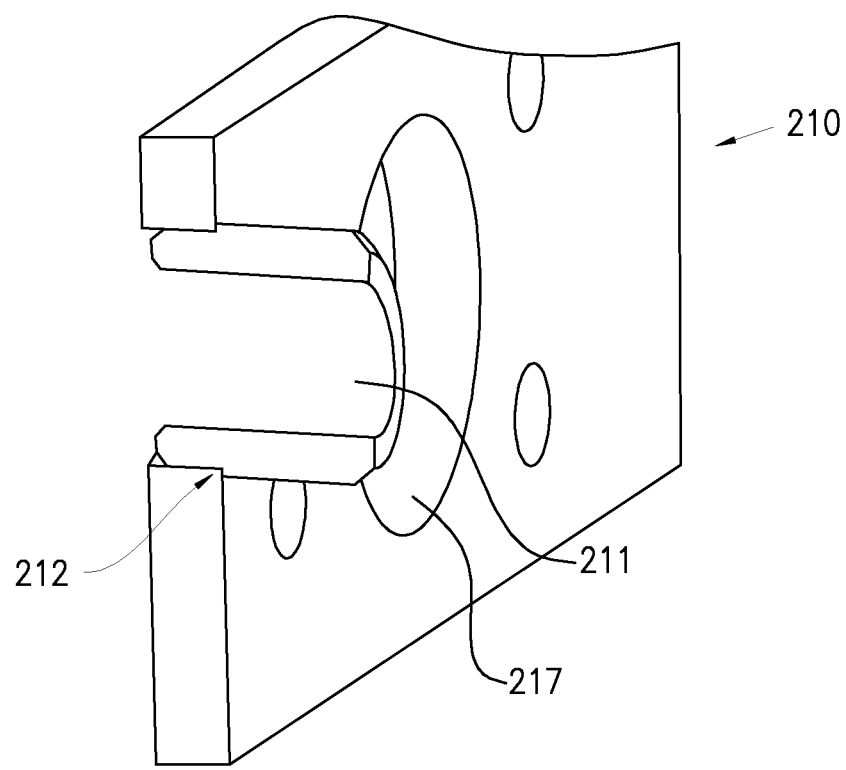
FIG. 20 shows an exemplary embodiment of a gooseneck frame mounting plate.

FIG. 20 shows an exemplary embodiment of the gooseneck frame mounting plate 210. Seat 212 on locating pin receiver bodies 211 center aligns in thru holes in gooseneck frame mounting plate 210. Seat 212 is shorter than mounting plate 210 thickness to ensure a proper fit up and combat tolerance stack up. Chamfered edge 217 prevents chaffing and/or other similar damage to the air hose(s) and/or electrical harness(es). A suitable rubber grommet may also be used instead to prevent abrasion of the air hose(s) and/or electrical harness(es).

Figure 21:
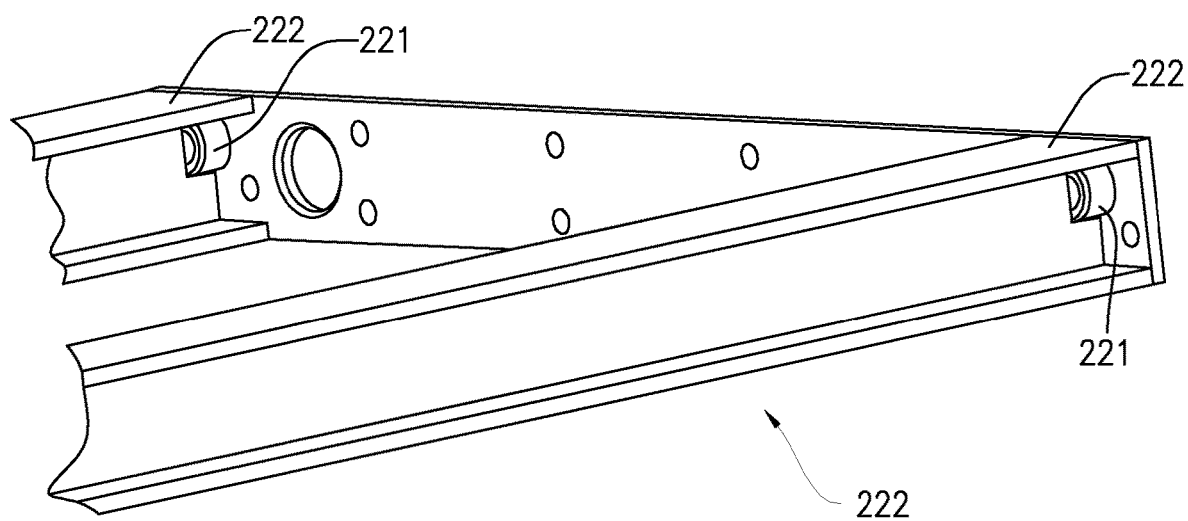
FIG. 21 shows an exemplary embodiment of notched gooseneck frame beams.

FIG. 21 shows an exemplary embodiment of gooseneck frame beams 222. Webs of gooseneck frame beams 222 are notched to receive, locate and affix locating pin receivers 221.

Figure 22:
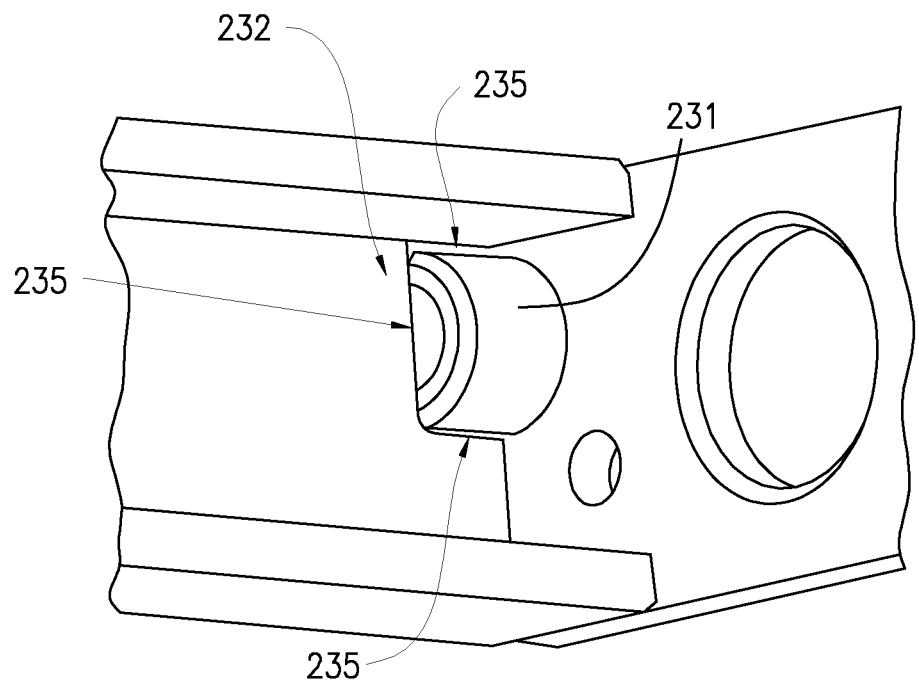
FIG. 22 shows an exemplary embodiment of locating pin receivers welded to gooseneck frame beam webs.

FIG. 22 shows locating pin receivers 231 are fillet welded on all exposed edges 235 to gooseneck frame beam webs 232 during gooseneck frame assembly.

Figure 23:
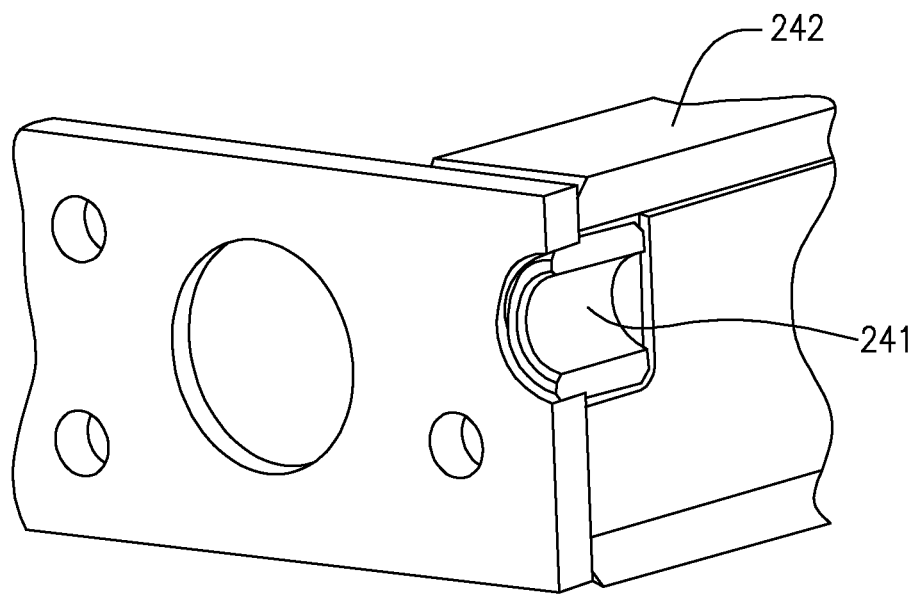
FIG. 23 shows an exemplary embodiment of locating pin receivers axially aligned with gooseneck frame beams.

FIG. 23 shows locator pin receivers 241 are axially aligned with gooseneck frame beams 242. This imparts bending/torsional stresses from the front bolster to the gooseneck frame beam members 242. The leading edges of top and bottom flanges of beams are chamfered to help combat chronic weld bead hang-up issues. Weld beads that experience chronic fatigue and ultimately failure that necessitates repair are moved axially rearward by the distance equal to the thickness of the gooseneck frame mounting plate. This means that these weld beads will no longer be the cause of "hang up" because this longitudinal translation moves the weld bead away from the critical point of the container to chassis interface.

Figure 24:
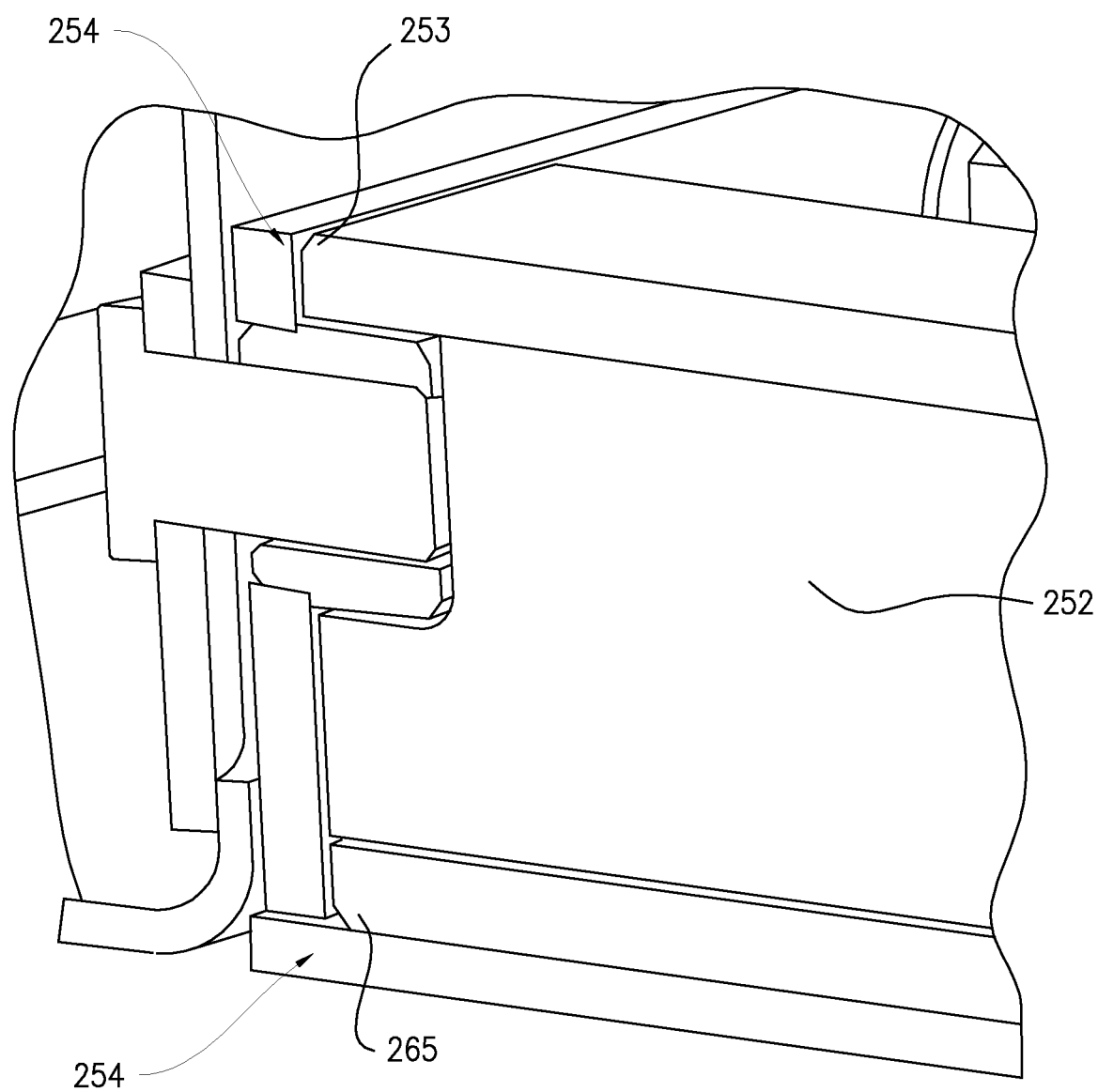
FIG. 24 shows an exemplary embodiment of chamfered top and bottom edges of front frame beam.

FIG. 24 shows gooseneck frame beam 252. Top 253 and bottom 255 edges of front frame beam 252 are chamfered at 254 to allow for superior weld penetration of this critical welded connection. Post weld grinding will ensure a perfectly flat surface for the container to sit upon.

Assembly Process

Fully assembled front bolster subassembly is suitably orientated in relation to fully assembled gooseneck frame subassembly. Locator pins in front bolster are aligned and fully engaged with receivers in gooseneck frame. Suitable fasteners such as flanged hex head screws, are inserted and torqued to specification in a tightening sequence that ensures that bolt-on front bolster is properly connected to the gooseneck frame. Air lines and electrical harness are run from gooseneck frame into the bolt on front bolster and connected during final stages of final assembly.

The chassis frame assembly is now 100% bolt-on in the final assembly production line. The present invention makes the front frame considerably easier to handle and paint. The front bolster components may now be part of a subassembly cell. The present invention also improves the assembly of gladhands and 7 pin connector, making assembly considerably easier and more ergonomic. The front bolster is 100% interchangeable during assembly and can be shipped to intermodal operators fully assembled or loose which substantially facilitates transportation options of new chassis for intermodal operators.

Retrofit Kit

The present invention also provides a retrofit kit for existing legacy chassis being used or in the market. The same or similar bolt-on bolster and fasteners, angle braces and mounting tabs are used, however minor changes to hole placement are made to accommodate the existing gooseneck frame members. This provides the same serviceability once the retrofit kit is installed. Existing, damaged front bolster and "wing" gussets are cut and/or ground off. A retrofit adapter plate and angle brace mounting tabs are suitably welded onto the gooseneck frame. Welding of the adapter plate onto the frame end is considerably easier than it is to weld on a replacement bolster. The retrofit bolt-on front bolster is then bolted up to this adapter plate. The use of the retrofit eliminates chronic weld failure and weld bead build up that cause's containers to hang-up, preventing front locking pin engagement. The retrofit kit weight increase is minor and will be acceptable to intermodal operators because of the increase in serviceability of an intermodal chassis equipped with the present invention.

Figure 25A:
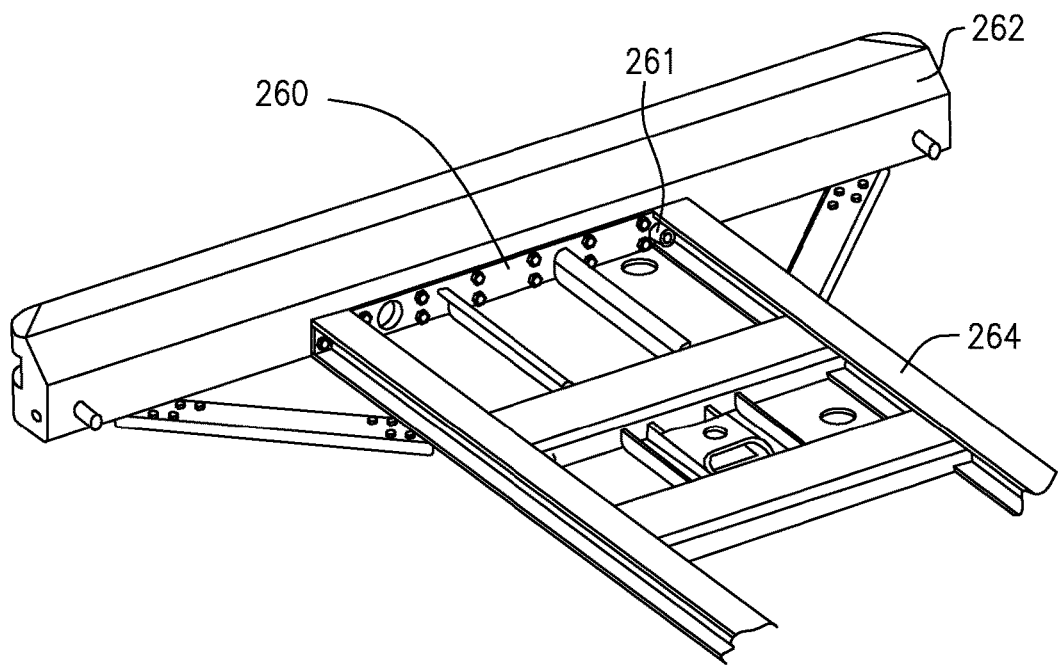
FIGS. 25a and 25b show an exemplary embodiment of a gooseneck frame mounting plate.
Figure 25B:
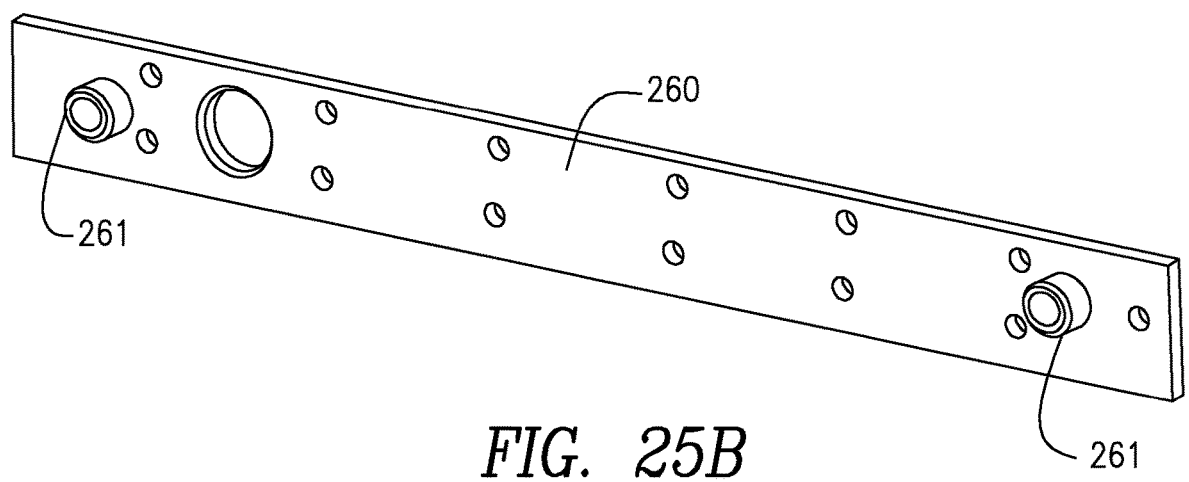

FIGS. 25a and 25b show an exemplary embodiment of adapter plate 260 connecting front bolster 262 and front frame 264. Two locating pin receivers 261 are fillet welded all around to adapter plate 260. Locating pins ensure exact final front bolster positioning.

Figure 26:
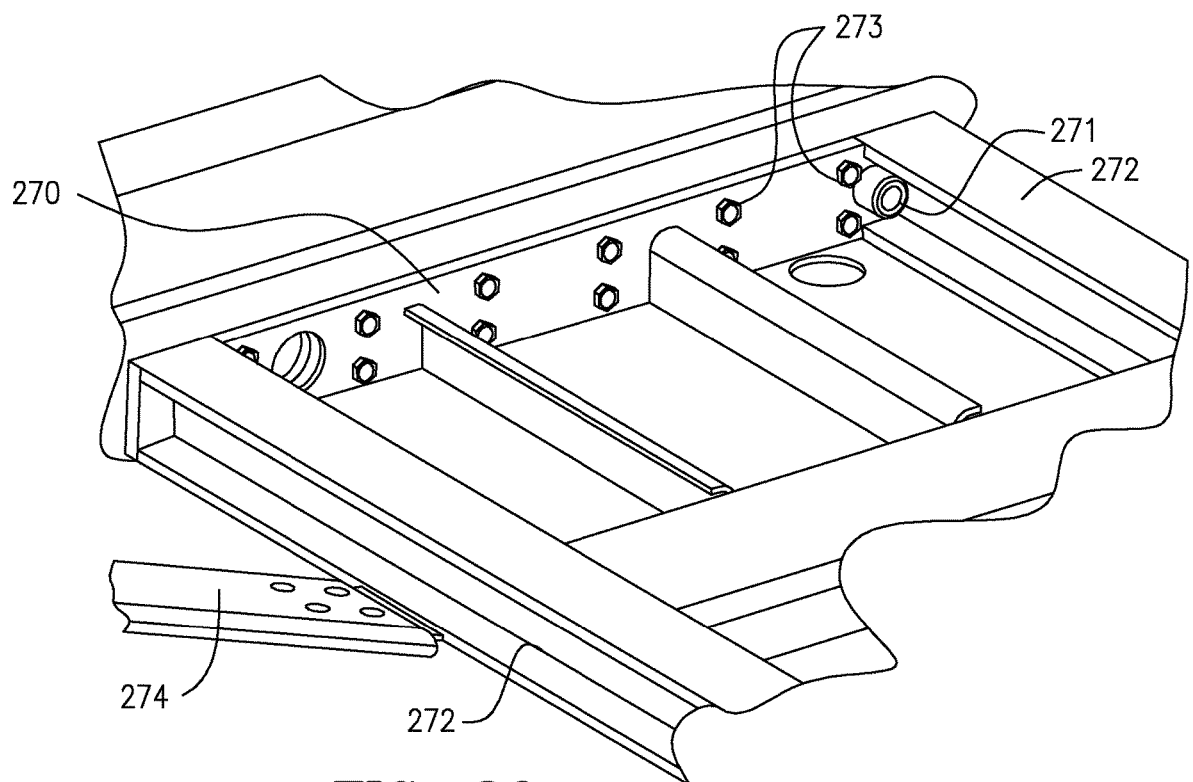
FIG. 26 shows an exemplary embodiment of a retrofit.

FIG. 26 shows mounting plate 270. The locating pin receivers 271 are moved inboard to avoid gooseneck frame main beam members 272. Locating pin receivers may be moved outboard to achieve the same result, if desired. The bolt hole pattern 273 is or can be revised to accommodate legacy construction and location of other frame members. Angle braces 274 may be similar or identical to the ones used on the rear bolster and/or similar or identical to the ones used on the production version of the present invention.

Figure 27:
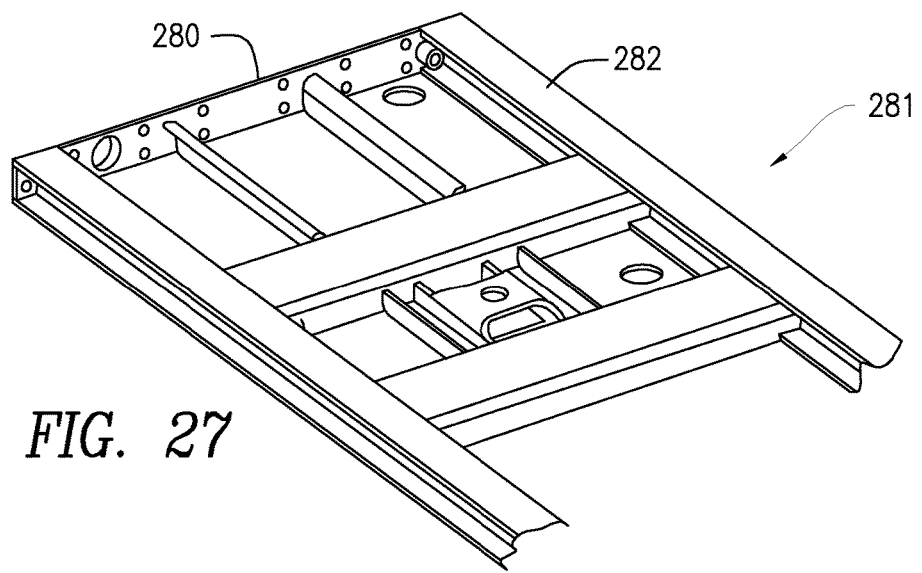
FIG. 27 shows an exemplary embodiment of a retrofit adapter plate.
Figure 28:
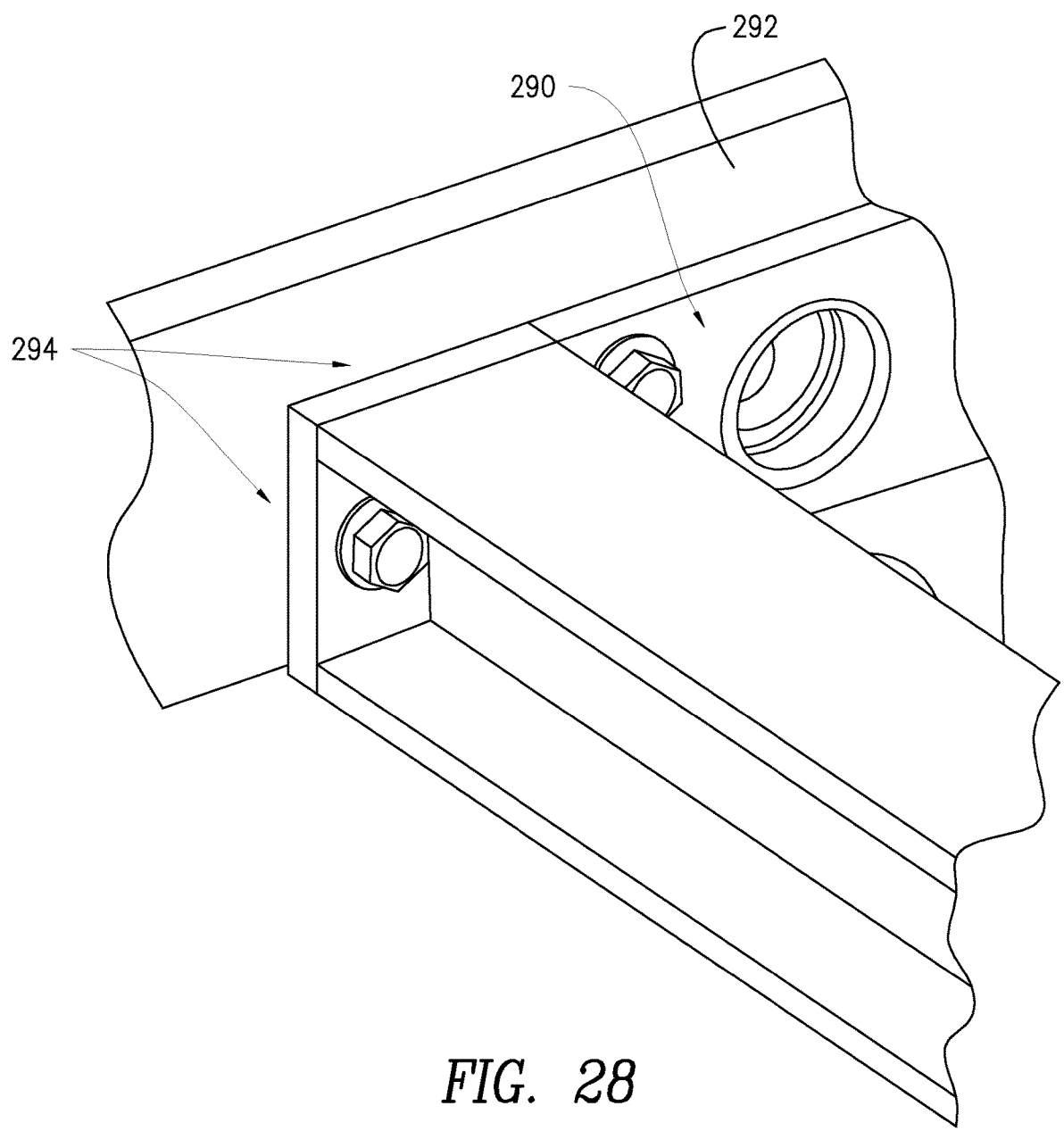
FIG. 28 shows an overlap in an exemplary embodiment of the present invention.

FIG. 27 shows an embodiment of an adapter mounting plate 280 that is welded to the end of the front frame 282 along each edge of each abutting component of the gooseneck frame 281. The same length of welding is used that would be required to conventionally install a replacement front bolster. An overlap 294, as shown in FIG. 28, represents an additional length of the existing gooseneck frame that is cut off when replacing the front bolster. This length is equal to the thickness of the adapter plate. This greatly facilitates removal of the damaged front bolster as the ends of the gooseneck frame members do not need to be preserved. Overlap 292 also removes much if not all of the heat effected zones on ends of existing gooseneck frame members 290 that is welded to the front bolster 292, maintaining the strength of the chassis. Intermodal operators will receive thorough retrofit installation instructions that will instruct applying a chamfer to the beam ends to ensure superior weld penetration between the adapter mounting plate 290 and existing gooseneck frame beams.

Alternate Embodiment

Figure 29:
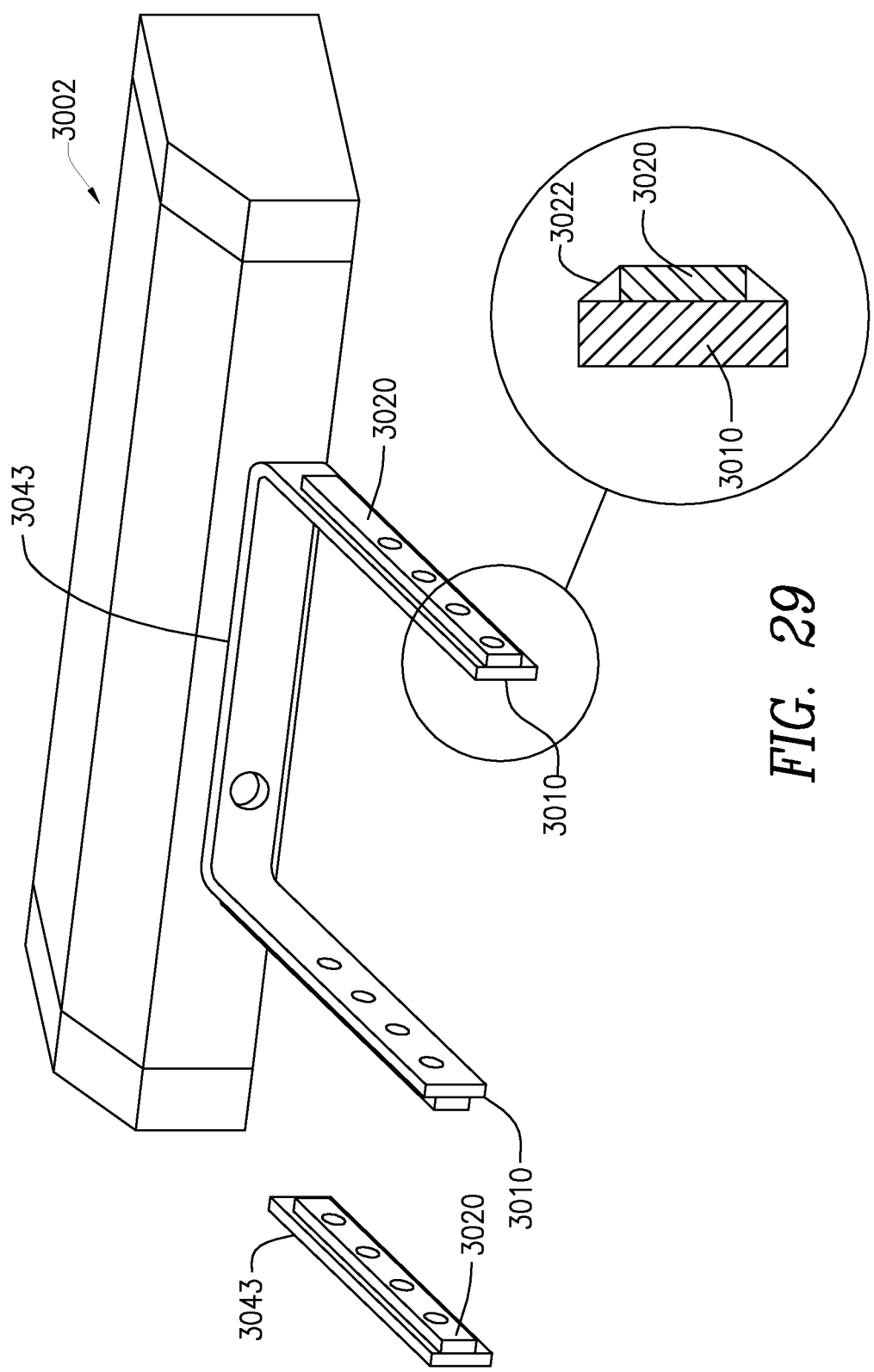
FIG. 29 shows an alternate embodiment with connecting arms.

FIGS. 29 through 32 show an alternate embodiment of the present invention replacing the locator pins/receivers with connecting arms that ensure lateral and vertical positioning of front bolster. Connecting arms slide in between existing gooseneck frame beams. The internal width of gooseneck frame beams is governed by AAR M-930 and does not change. Connecting arms are bent to slide inside the internal width of the gooseneck frame beams. Spacers are used to stand connecting arms off from fillet welds that are used to fabricate the composite gooseneck frame beams. FIG. 29 shows connecting arms 3010 which are a single piece of formed steel. The lateral portion of connector arms 3010 are welded, full perimeter, to bolt-on front bolster assembly 3002 using weld fixtures. The length of the weld bead greatly exceeds the length of the welds used in prior art. (Operators may also weld existing upper coupler members to the lateral portion of the connector arms.) This precisely locates connecting arms and ensures clearance with intermodal containers. Arm backing plate 3043 mirrors the composite construction of connecting arms 3010 and is the same length as connecting arms 3010. Arm backing plate 3043 stands connecting arms 3010 away from the web of existing gooseneck frame beams. Spacer plate 3020 is located between fillet welds 3022 and is also the same length as connecting arms 3010. The existing beams are manufactured assemblies and have large fillet welds that make abutting a connecting arm up against them difficult. FIGS. 31b and 32a, show this detail more clearly.

Figure 30:
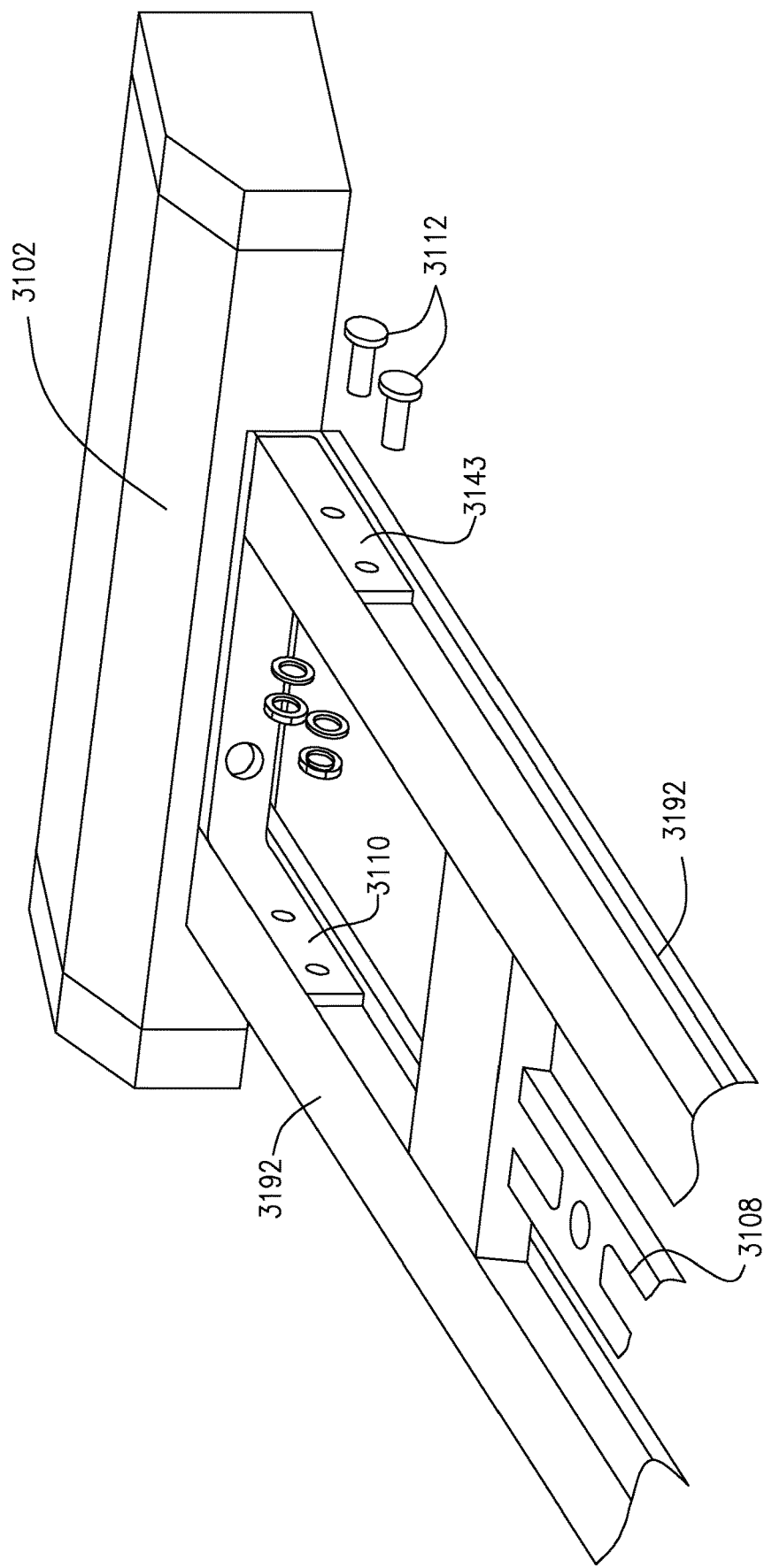
FIG. 30 shows another view of the alternate embodiment.
Figure 31B:
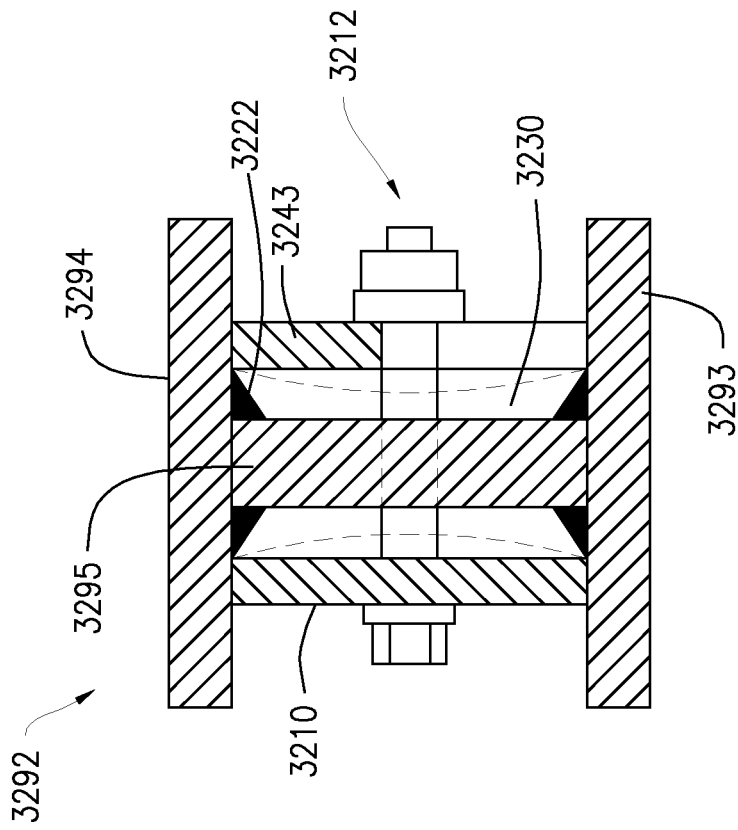
FIGS. 31a and 31b show cross section of a roadside gooseneck frame beam with connecting arms and the existing gooseneck frame, and FIGS. 32a and 32b also show a cross section of the roadside gooseneck frame beam of the alternate embodiment on existing gooseneck frame beams.
Figure 31A:
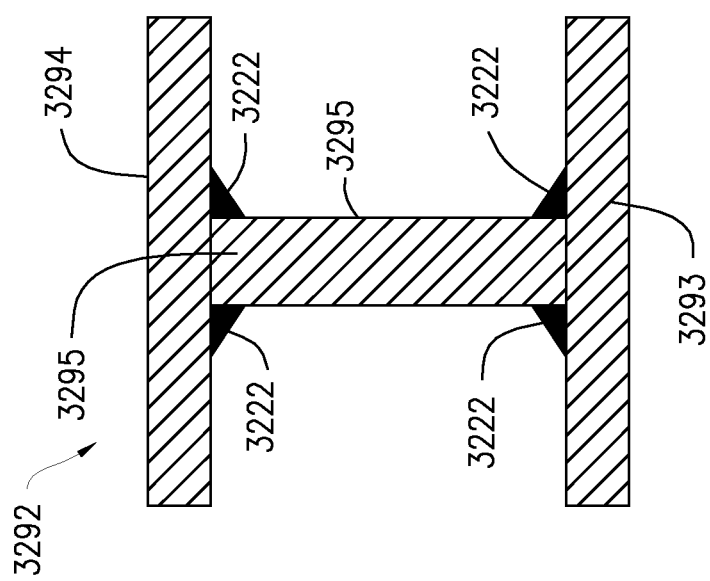

FIG. 30 shows connecting arms 3110 slide in between existing gooseneck frame beams 3192. Connecting arms 3110 engage both top and bottom flanges of existing gooseneck frame beams 3192. This assures correct alignment and bending, shear and torsional strength. Connecting arms 3110 provide a significantly greater axial engagement with gooseneck frame beams 3192 adding considerable strength to front bolster 3102 connection with the gooseneck frame. This connection provides greater strength than the prior art. Backing plates 3143 are thru fastened 3112 to connecting arms 3110. Alternatively, this assembly may be suitably welded FIGS. 31a and 31b show a cross section of the roadside gooseneck frame beam 3292 having a top flange 3294, a bottom flange 3293 and a web 3295. Gooseneck frame beam 3292 is a composite construction having pronounced fillet welds 3222 in four critical locations. FIG. 31b shows gap 3230 between connecting arm 3210 and web 3295, as well as gap 3230 between backing plate 3243 and web 3295 preventing proper fit up and clamping. FIG. 31b also shows thru bolt assembly 3212.

Figure 32B:
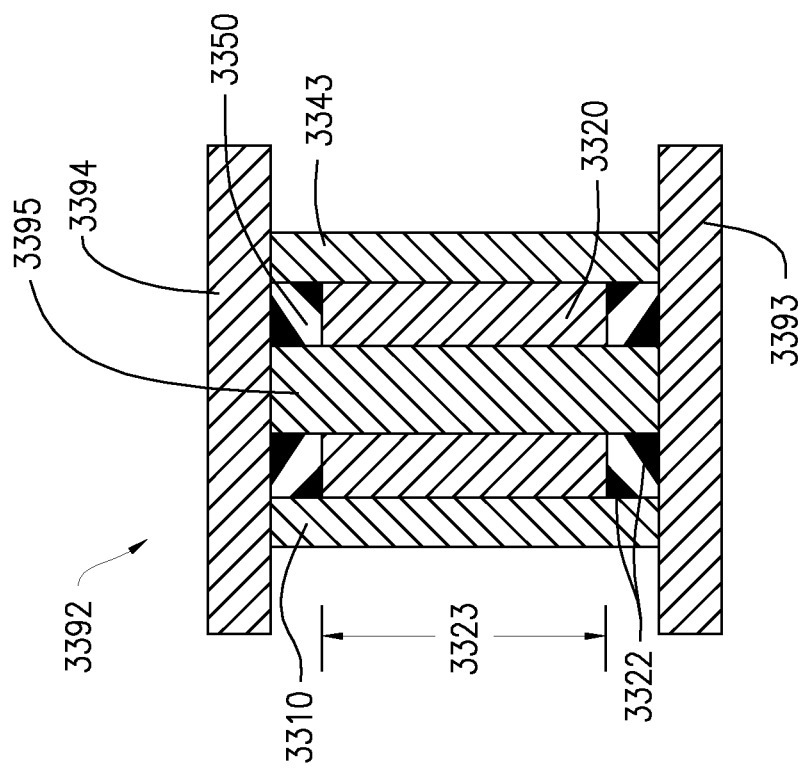
Figure 32A:
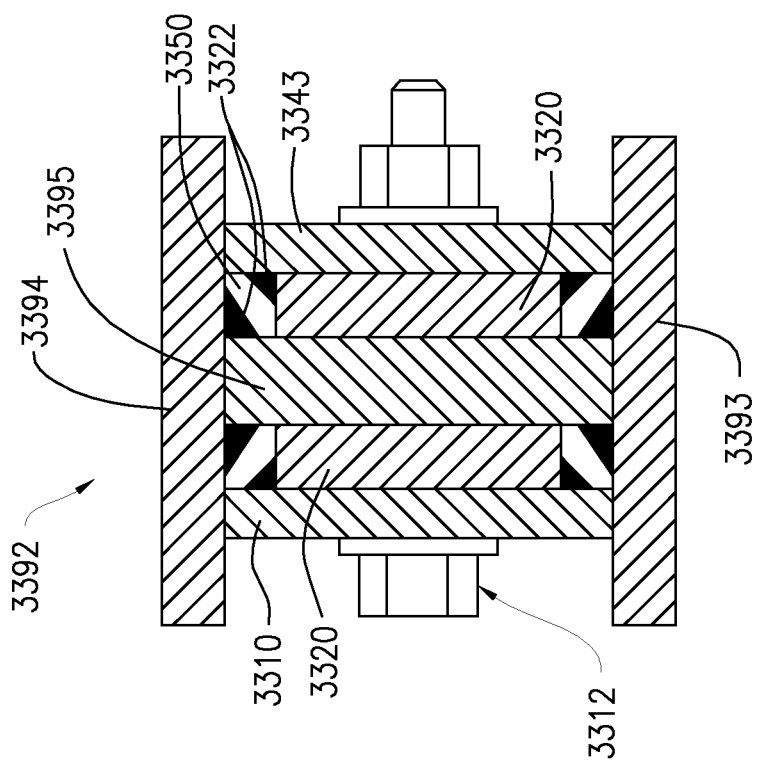

FIGS. 32a and 32b show a cross section of the roadside gooseneck frame beam with connecting arms 3310, backing plates 3343 and spacer plates 3320. Spacer plates match the construction in length of connecting arm 3310 and are installed into outboard recesses of the gooseneck frame beams 3392 to complete a "sandwich" construction. Spacer plates 3320 are integral to connecting arms 3310 and backing plates 3343 and may be factory welded. Spacer plates 3320 may also be supplied loose to enhance assembly fabrication flexibility during the retrofit procedure. Spacer plates 3320 are there to "stand" the backing plates and connecting arms off of the weld beads on the gooseneck frame beam. Backing plates 3343 are located on the outside of gooseneck frame beam 3392 and connecting arms are located on the inside of gooseneck frame beam 3392. Gooseneck frame beam 3392 has a top flange 3394, bottom flange 3393 and a web 3395. The entire assembly is then thru bolted 3312 together on either gooseneck frame beam. The head of fastener 3312 is fully recessed within the gooseneck beam therefore ensuring zero interference when a container is loaded on the chassis in this instance. The height 3323 of spacer plates 3320 clears fillet welds 3322 and clearance 3350 and bridge the width of fillet welds 3322. Backing plates 3343 (and integral spacer) 3320 are not required on outboard locations. Connecting arms may also be a weldment consisting of multiple parts welded perpendicularly to each other and surround ("hug") the outside of both gooseneck frame beams.

The retrofit for the alternate embodiment disclosed requires zero welding. The damaged front bolster is torched/ground off and the alternate embodiment is slid into the gooseneck frame beams and bolted in place. The precision of cutting off the front bolster is now irrelevant since an adapter plate is not being welded onto the existing gooseneck frame members. The webs of the gooseneck frame beams have locating/fastening holes drilled. Because there is no welding, the heat effected zone is mitigated and no more heat needs to be applied to the gooseneck frame beams. The longitudinal position of the front bolster is controlled dimensionally. Intermodal operators measure the longitudinal distance from a suitable reference point, such as the kingpin, to the front bolster. This dimension can then be compared to installation instructions instructing the operators where to drill corresponding locating fasteners/holes. With this embodiment, the fasteners are subjected to considerably lower stress.

Although the present invention has been described in conjunction with specific embodiments, those of ordinary skill in the art will appreciate the modifications and variations that can be made without departing from the scope and the spirit of the present invention.

What is claimed is:
1. A front bolster and frame connection system for an intermodal chassis comprising:
   a front bolster;
   a front gooseneck frame extending from the intermodal chassis having beams;
   at least one bolster mounting tab attached to the front bolster;
   at least one frame mounting tab attached to the front gooseneck frame;
   a front gooseneck frame mounting plate welded into the front gooseneck frame;
   a backing plate located inside the front bolster, wherein the mounting plate and the backing plate are fastened together; and at least one angle brace attached to the at least one bolster mounting tab and the at least one frame mounting tab, wherein the at least one angle brace connects the front bolster and the front gooseneck frame.

2. The bolster and frame connection system as recited in claim 1, wherein the backing plate connects to a channel in the front bolster and the backing plate has a hole pattern that matches a hole pattern of the front bolster.

3. The bolster and frame connection system as recited in claim 1, further comprising internal front bolster stiffeners notched to receive the backing plate.

4. The bolster and frame connection system as recited in claim 1, wherein the mounting plate and the backing plate fastened together connects the front bolster to the front gooseneck frame.

5. The bolster and frame connection system as recited in claim 2, wherein the backing plate is connected to the channel of the front bolster with perimeter welds on an inside of the front bolster.

6. The bolster and frame connection system as recited in claim 4, wherein mounting plate and the backing plate are fastened together with locator pins and receivers.

7. The bolster and frame connection system as recited in claim 1, wherein the front bolster has grounded flat plug welded slots.

8. The bolster and frame connection system as recited in claim 1, wherein a front face of the gooseneck mounting plate has no welding, to ensure zero interference when abutting an inside face of the bolted on front bolster.

9. The bolster and frame connection system as recited in claim 1, wherein the mounting plate comprises a seat and chamfered edges, wherein the seat is shorter than a mounting plate thickness.

10. The bolster and frame connection system as recited in claim 1, wherein the front gooseneck beams have notched webs to receive, locate and affix locating pin receivers.

11. The bolster and frame connection system as recited in claim 1, wherein leading edges of top and bottom flanges of the front gooseneck beams are chamfered.

12. A front bolster retrofit kit comprising:
a front bolster;
mounting tabs;
an adapter plate, wherein the adapter plate length is the distance between parallel beams of an existing front gooseneck frame; and
angle braces that attach to the mounting tabs, wherein the angle braces connect the front bolster and the existing front gooseneck frame of an intermodal chassis.

13. A bolster and frame connection system for an intermodal chassis comprising:
a front bolster;
a front gooseneck frame having parallel beams extending from the intermodal chassis;
connecting arms bent to slide in between an internal width of the parallel beams of the front gooseneck frame; and
integral spacer plates, wherein the integral spacer plates provide a space between the connecting arms and one or more welds on each of the parallel beams of the front gooseneck frame.

14. The bolster and front frame connection for an intermodal chassis as recited in claim 13, wherein the connecting arms are a single piece of formed steel.

15. The bolster and front frame connection for an intermodal chassis 13, wherein the connecting arms are through fastened to front gooseneck beam webs.

16. The bolster and front frame connection for an intermodal chassis as recited in claim 13, wherein the connecting arms are welded to the parallel beams.

17. The bolster and frame connection system as recited in claim 15, wherein a head of the through fastener is fully recessed within the parallel beams.

18. The bolster and frame connection system as recited in claim 13, further comprising arm backing plates connected to the connecting arms, wherein the arm backing plates provide a space between the connecting arms and one or more welds on the parallel beams.

19. The bolster and frame connection system as recited in claim 13, wherein the connecting arms are a weldment consisting of multiple components welded perpendicularly to one another.

20. The bolster and frame connection system as recited in claim 1, wherein the at least one bolster mounting tabs are attached to the front bolster by welding and the at least one frame mounting tabs are attached to the gooseneck frame by welding.

* * * * *